(12) United States Patent
Choi et al.

(10) Patent No.: US 9,769,299 B2
(45) Date of Patent: Sep. 19, 2017

(54) MOBILE TERMINAL CAPABLE OF RECOGNIZING AT LEAST ONE APPLICATION INTER-WORKABLE WITH ANOTHER EXECUTED APPLICATION AND CONTROLLING METHOD THEREOF

(71) Applicant: LG ELECTRONICS INC., Seoul (KR)

(72) Inventors: Byungyoon Choi, Seoul (KR); Seonok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 313 days.

(21) Appl. No.: 13/676,969

(22) Filed: Nov. 14, 2012

(65) Prior Publication Data

US 2013/0122961 A1 May 16, 2013

(30) Foreign Application Priority Data

Nov. 14, 2011 (KR) .................. 10-2011-0118049
Dec. 12, 2011 (KR) .................. 10-2011-0132813

(51) Int. Cl.
| | |
|---|---|
| *G06F 3/0481* | (2013.01) |
| *H04M 1/725* | (2006.01) |
| *G06F 9/44* | (2006.01) |
| *G06F 9/445* | (2006.01) |
| *G06F 3/0484* | (2013.01) |

(Continued)

(52) U.S. Cl.
CPC ...... *H04M 1/72519* (2013.01); *G06F 3/0484* (2013.01); *G06F 3/0486* (2013.01); *G06F 3/04817* (2013.01); *G06F 3/04883* (2013.01); *G06F 3/04886* (2013.01); *G06F 9/445* (2013.01); *G06F 9/4443* (2013.01)

(58) Field of Classification Search
CPC ......... H04M 1/72583; H04M 1/27455; H04M 1/72522; H04M 2250/22; H04M 1/72569
USPC .......................................... 715/864
See application file for complete search history.

(56) References Cited

U.S. PATENT DOCUMENTS

| | | |
|---|---|---|
| 2007/0143702 A1 | 6/2007 | Maggi |
| 2007/0226650 A1 | 9/2007 | Hintermeister et al. |
| 2009/0006400 A1 | 1/2009 | Lopez |

(Continued)

FOREIGN PATENT DOCUMENTS

| | | |
|---|---|---|
| EP | 0747804 A1 | 12/1996 |
| WO | WO 2011/097051 A2 | 8/2011 |

*Primary Examiner* — Namitha Pillai
(74) *Attorney, Agent, or Firm* — Birch, Stewart, Kolasch & Birch, LLP

(57) ABSTRACT

A mobile terminal having a wireless communication unit configured to wirelessly communicate with at least one other terminal, a touchscreen configured to display a screen of a specific one of a plurality of currently active applications, the displayed screen including selectable content and a controller is provided. When at least one selectable content is selected from the displayed screen, the controller is configured to control the touchscreen to display an information indicator indicating at least one application capable of executing the selected content among the plurality of currently active application. When the displayed information indicator is selected, the controller is configured to execute the selected content via an application corresponding to the selected information indicator.

20 Claims, 30 Drawing Sheets

(51) Int. Cl.
  *G06F 3/0486* (2013.01)
  *G06F 3/0488* (2013.01)

(56) References Cited

U.S. PATENT DOCUMENTS

| | | |
|---|---|---|
| 2009/0070695 A1* | 3/2009 | Oh et al. ........................ 715/769 |
| 2009/0158212 A1* | 6/2009 | Dykstra-Erickson et al. ............................ 715/811 |
| 2010/0066698 A1* | 3/2010 | Seo ............................... 345/173 |
| 2010/0313156 A1 | 12/2010 | Louch et al. |
| 2011/0072393 A1 | 3/2011 | Wilairat |
| 2011/0131529 A1 | 6/2011 | Doi et al. |
| 2011/0167339 A1 | 7/2011 | Lemay |
| 2011/0179387 A1 | 7/2011 | Shaffer et al. |

* cited by examiner

MOBILE TERMINAL CAPABLE OF RECOGNIZING AT LEAST ONE APPLICATION INTER-WORKABLE WITH ANOTHER EXECUTED APPLICATION AND CONTROLLING METHOD THEREOF

Pursuant to 35 U.S.C. §119(a), this application claims the benefit of earlier filing date and right of priority to Korean Application No. 10-2011-0118049, filed on Nov. 14, 2011, and Korean Application No. 10-2011-0132813 filed on Dec. 12, 2011, the contents of which are hereby incorporated by reference herein in their entirety.

BACKGROUND OF THE INVENTION

Field of the Invention

The present invention relates to a mobile terminal, and more particularly, to a mobile terminal and a method of controlling the mobile terminal.

Discussion of the Related Art

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals according to a presence or non-presence of mobility. In addition, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As such terminals as smart phone and the like are frequently used, numerous applications are being developed to provide various kinds of functions available for the smart phones. In particular, a terminal includes a multi-tasking function to activate functions of several applications at the same time. For instance, a user activates to use various functions of webpage, image, document and the like in a terminal while listening to music via the terminal.

However, it is inconvenient for a user to switch a currently displayed screen of a specific first application to a screen of a send application by switching the current screen of the first application to a home screen and then selecting to switch to the screen of the second application within the home screen.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which the following operations can be achieved. First of all, while a screen of a specific one of at least two currently active applications is being displayed, the applications are searched for an application inter-workable with a content included in the screen of the specific application, a user is informed of the found application, and the content can be directly activated via the found application.

Another object of the present invention is to provide a mobile terminal and controlling method thereof, by which operations of applications currently multi-tasked on an ongoing screen can be incorporatively managed and controlled.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to an embodiment of the present invention may include a touchscreen configured to display a screen of a specific one of a plurality of currently active applications, and a controller, if at least one application is selected from the displayed screen, to control the touchscreen to display information indicating at least one application capable of executing the selected content among the plurality of currently active applications, and the controller, if the information is selected, to execute the selected content via an application corresponding to the selected information.

In another aspect of the present invention, a method of controlling a mobile terminal according to an embodiment of the present invention may include the steps of displaying a screen of a specific one of a plurality of currently active applications, if at least one content is selected, recognizing at least one application capable of executing the selected content among the plurality of currently active applications, displaying information indicating the recognized at least one application on the screen, and if the information is selected, executing the selected content via the application corresponding to the selected information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipment, smart phones, digital televisions (DTVs), computers, digital broadcast terminals, personal digital assistants, portable multimedia players (PMP) and navigators. For ease of description, the present invention will be described with respect to a mobile terminal 100 shown in FIGS. 1 through 2B. However, it should be understood that the present invention can also be applied to other types of terminals.

Figure 1:
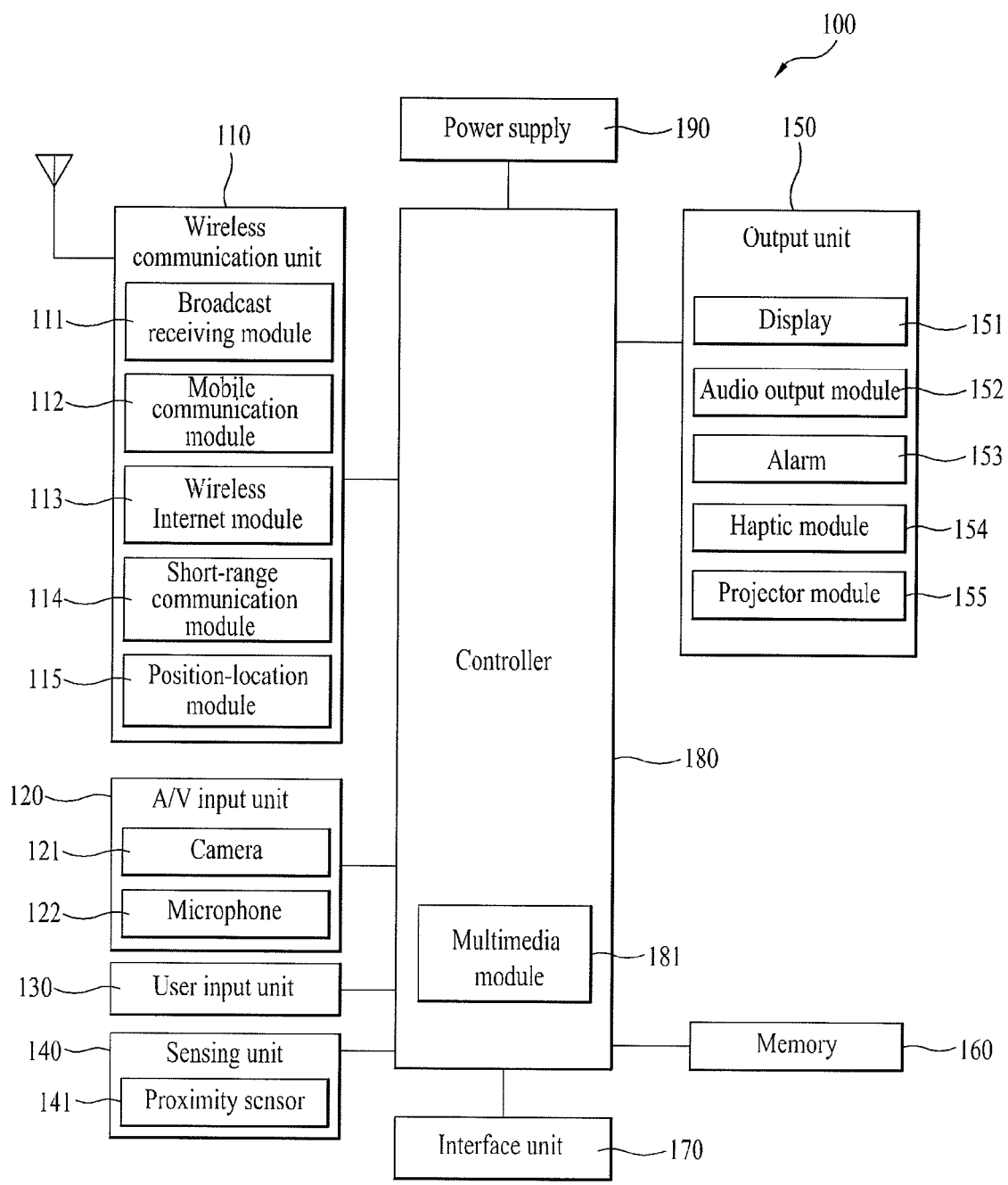
FIG. 1 illustrates a block diagram of a mobile terminal in accordance with one embodiment of the present invention.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112. The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast—convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA). Moreover, as mentioned in the foregoing description, the wireless internet module 113 can receive or download the data relevant to the area, in which the mobile terminal 100 is located, from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ or ZigBee™.

The position-location module 115 identifies or otherwise recognizes the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video recognized by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100. For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller. The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source, such as a laser, that generates adequate light for external projection of an image, means for producing the image to be projected via the light generated from the light source, and a lens for enlarging the projected image according to a predetermined focus distance. The projector module 155 can further include a device for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
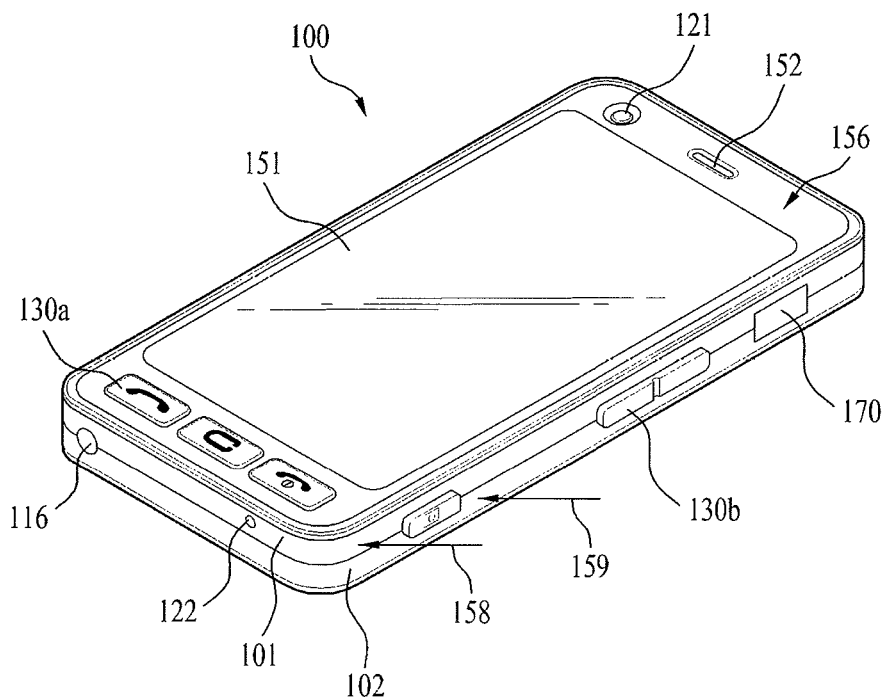
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body. However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
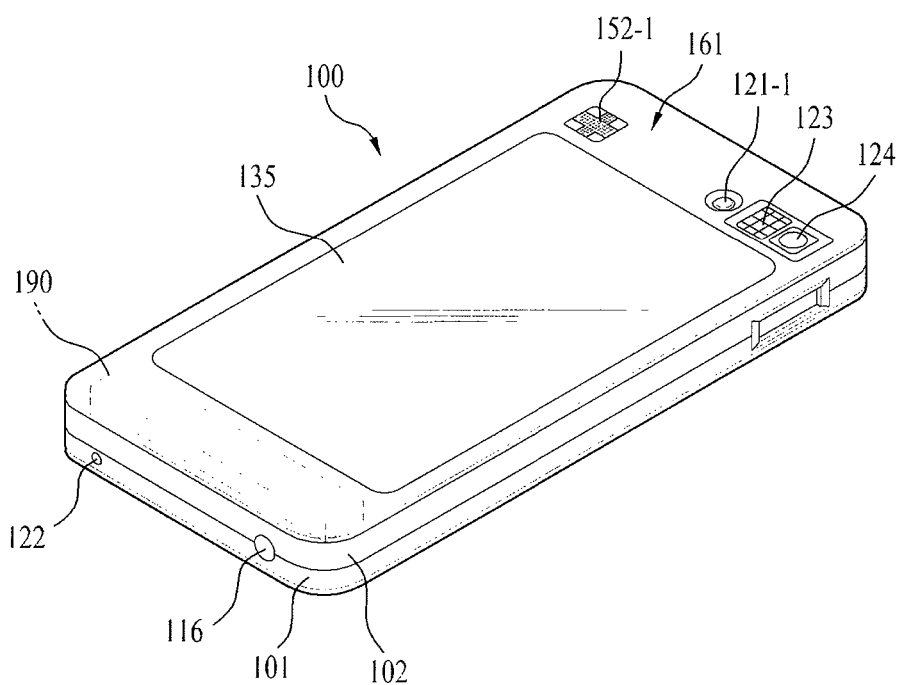
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, while a screen of a specific one of currently active applications is being displayed, a process for searching the applications for an application capable of interworking with a content included in the screen of the specific application, informing a user of the found application, and then directly activating the content via the found application (or function) is explained in detail with reference to FIGS. 3 to 30.

Figure 3:
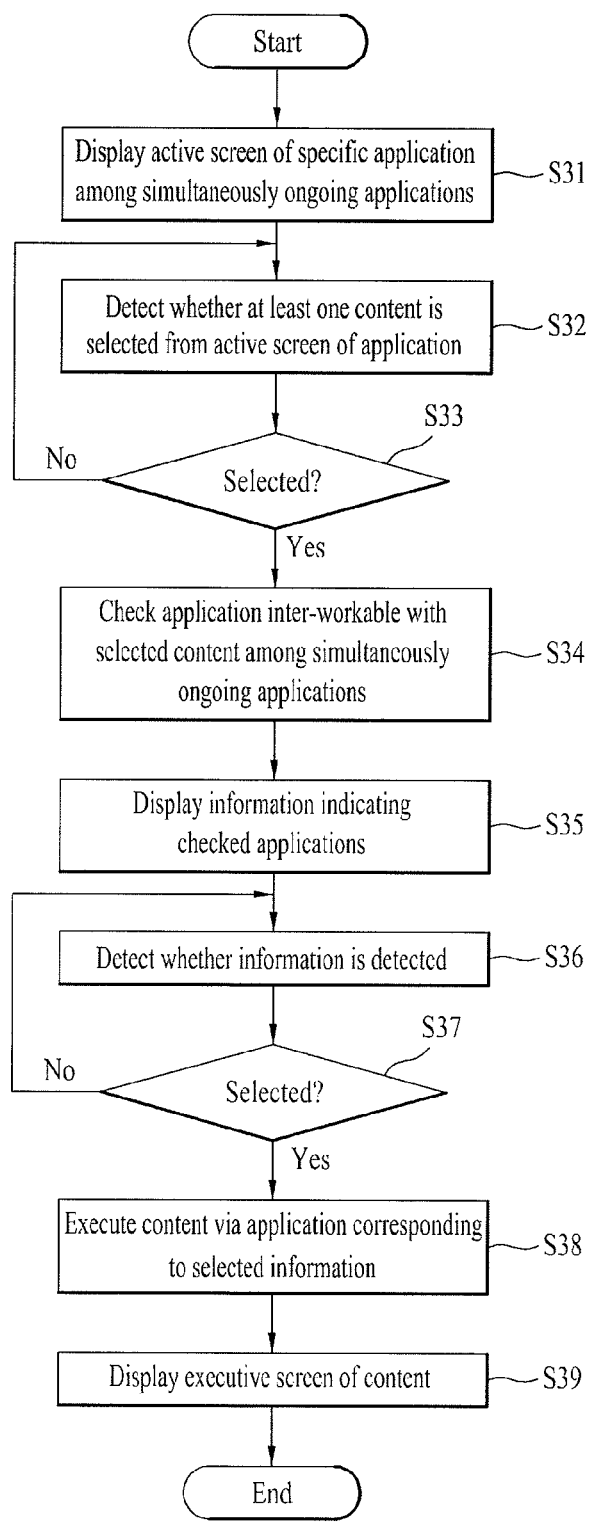
FIG. 3 is a flowchart for a method of controlling a mobile terminal according to an embodiment of the present invention.

FIG. 3 is a flowchart for a method of controlling a mobile terminal according to an embodiment of the present invention and FIGS. 4 to 30 are diagrams of display screen configurations to implement a method of controlling a mobile terminal according to an embodiment of the present invention.

Referring to FIG. 3, in a multi-tasking state that at least two applications selected by a user are active, the controller 180 of the mobile terminal 100 displays an active screen of a specific application selected by the user from the active applications on the display unit 151 [S31]. In doing so, the application provides a specific function and the function provided by the application may include one of a function corresponding to a specific menu, a function corresponding to a specific widget and the like.

The controller 180 detects whether at least one content is selected from contents included in the active screen of the specific application [S32]. In this instance, the contents mean objects included in the active screen of the specific application or objects attached thereto. For instance, the contents may include a text, a file, an image, a specific function assigned icon, a specific webpage address, a specific webpage linked hyperlink and the like.

If the at least one content is selected [S33], the controller 180 recognizes at least one application inter-workable with the selected content among the currently active applications except the specific application [S34]. In doing so, the application inter-workable with the selected content may include one of an application capable of activating the selected content, an application for activating a function associated with the selected content, an application capable of searching for information associated with the selected content via web and the like.

For instance, assuming that the selected content is a text 'LG Optimus Black' and that the simultaneously ongoing applications include an application providing a web browser function and a 'You Tube' application providing UCC (user created contents) video, because information related to the 'LG Optimus Black' can be found via each of the web browser application and the You Tube application, the selected text 'LG Optimus Black', the web browser and the You Tube application are inter-workable.

For another instance, assuming that the selected content is an audio file 'LG Optimus Black.MP3' and that the simultaneously ongoing applications include an audio play application and a video play application, because the music file 'LG Optimus Black.MP3' can be played by each of the audio play application and the video play application, the selected audio file 'LG Optimus Black.MP3', the audio play application and the video play application are inter-workable.

Meanwhile, the controller 180 recognizes applications belonging to a group previously configured by a user from the simultaneously ongoing applications and may recognize applications inter-workable with the selected content from the recognized applications as well. This process shall be described in detail with reference to FIG. 7 later.

Thus, once the controller 180 recognizes the at least one or more application inter-workable with the selected content from the currently ongoing applications, the controller 180 creates information indicators indicating each of the recognized applications and then displays the created information indicators on the active screen of the specific application [S35]. In doing so, the information indicators may be represented as one of a thumbnail image, a text, an icon and the like to indicate each of the recognized applications.

Meanwhile, the controller 180 may display the information indicators by arranging them on a top or bottom end of the active screen of the specific application. The controller 180 may display the information indicators transparently on the active screen of the specific application. The controller 180 may display the information indicators in a manner that the information indicators overlap over the active screen of the specific application. The controller 180 may display the information indicators at or around the position of the selected content. The controller 180 may display the information indicators as a list on the active screen of the specific application.

If a drag or flicking touch having specific directionality is input to the active screen of the specific application, the controller 180 shifts the active screen of the specific application in a direction corresponding to the drag or flocking touch and then displays the information indicators in a region between an initial position of the active screen of the specific application and the shifted position. This process shall be described in detail with reference to FIG. 5 later.

The controller 180 detects whether a specific information indicator is selected from the information indicators [S36]. If the specific information indicator is selected [S37], the controller 180 activates the selected content via the application corresponding to the selected information indicator [S38]. Subsequently, the controller 180 displays the active screen of the content [S39].

Desirably, if the specific information indicator among the information indicators is directly touched by the user, the controller 180 may activate the selected content via the application corresponding to the touched information indicator. If the selected content is shifted to the information indicator displayed position by being dragged and dropped or the specific information indicator is shifted to the selected content displayed position by being dragged and dropped, the controller 180 may activate the selected content via the application corresponding to the specific information indicator. If both of the content and the specific information indicator are simultaneously multi-touched, the controller

180 may activate the selected content via the application corresponding to the specific information indicator.

In displaying the active screen of the content, the controller 180 switches the active screen of the specific application to the active screen of the content. In displaying the active screen of the content, the controller 180 may further display the active screen of the content as a new window on the active screen of the specific application. In displaying the active screen of the content, the controller 180 partitions the screen of the display unit 151 into a first region and a second region and then displays the active screen of the specific application and the active screen of the content on the first region and the second region, respectively. In displaying the active screen of the content, the controller 180 reduces the active screen of the content into a thumbnail and then displays the thumbnail at a display position of the content within the active screen of the specific application.

If a drag or flicking touch having specific directionality is input to the active screen of the specific application, the controller 180 shifts the active screen of the specific application in a direction corresponding to the drag or flicking touch and then displays the active screen of the content between an initial position of the active screen of the specific application and the shifted position. This process shall be described in detail with reference to FIG. 10 later.

Figure 4:
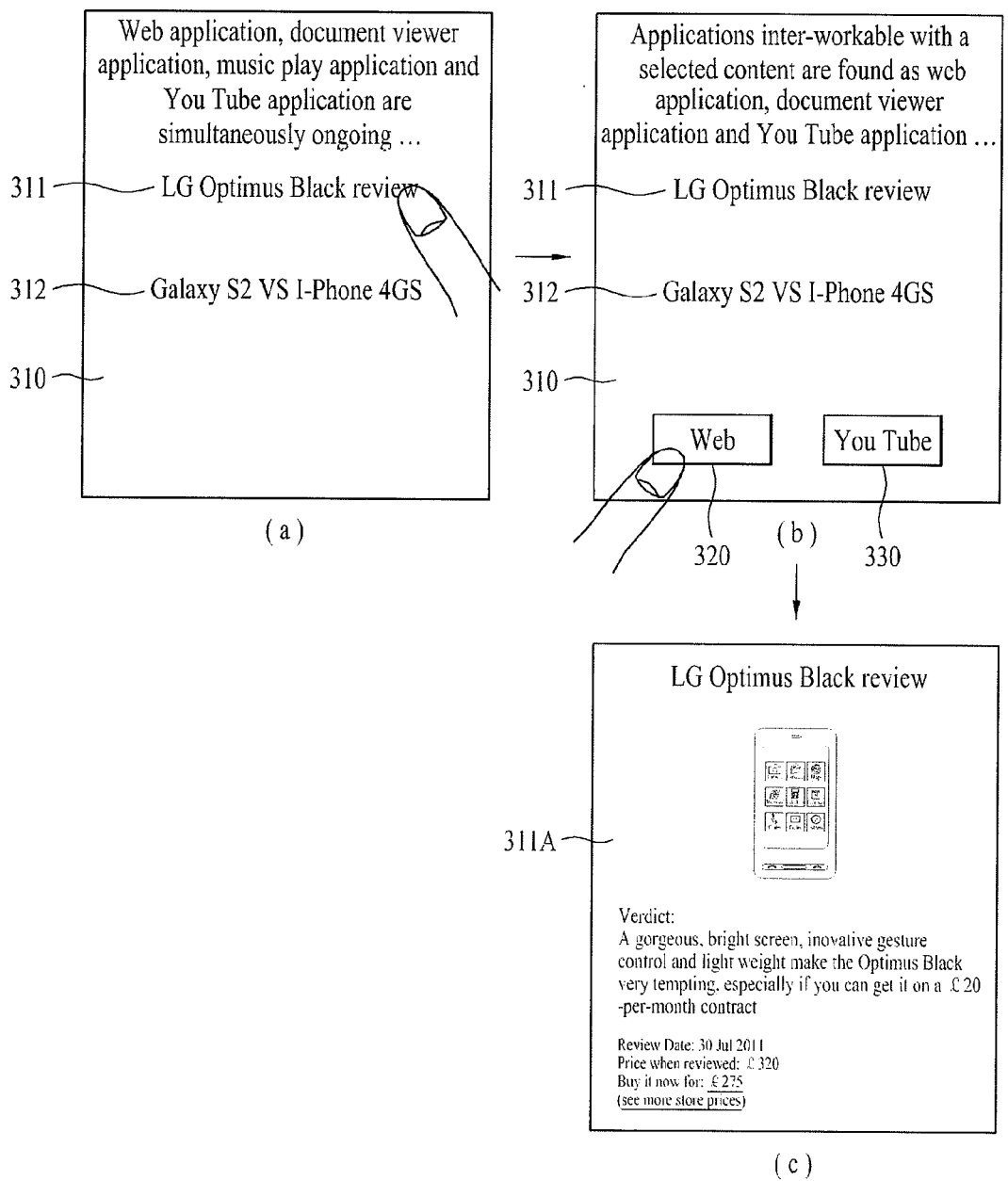
FIGS. 4 to 30 are diagrams of display screen configurations to implement a method of controlling a mobile terminal according to an embodiment of the present invention.
Figure 5:
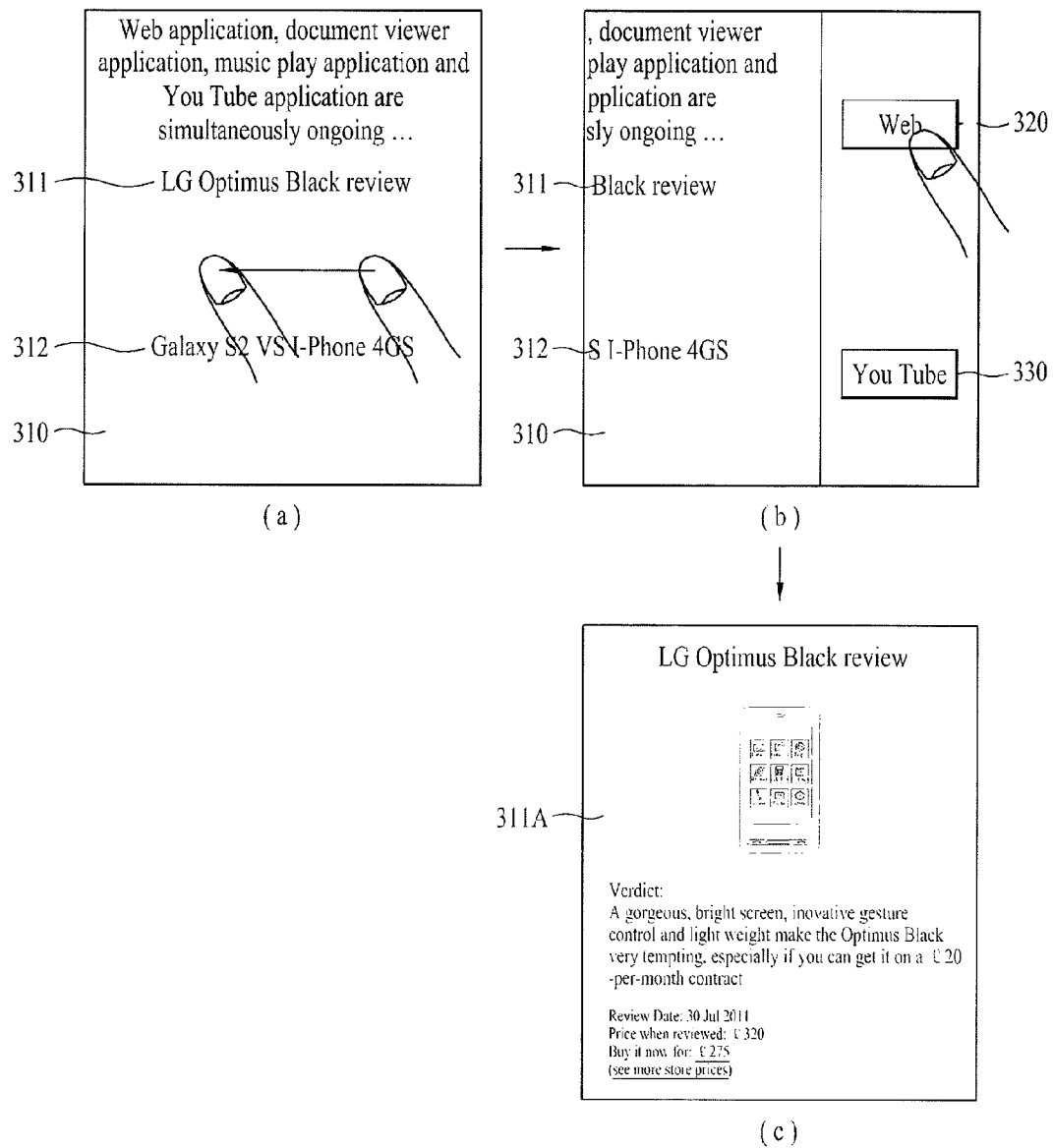

FIG. 4 shows one example of the steps S31 to S39 shown in FIG. 3. Referring to FIG. 4, the simultaneously ongoing applications include a web application, a document viewer application, a music play application and a You Tube application. An application currently displayed on the screen is the document viewer application containing at least two texts 311 and 312 [FIG. 4 (*a*)].

If a whole part of the first text 311 or a portion of the first text 311 is designated on a document viewer screen 310, referring to FIG. 4 (*b*), the controller 180 recognizes applications inter-workable with the designated first text 311 among the simultaneously ongoing web, music play and You Tube applications and then displays information indicators 320 and 330 indicating the recognized applications, respectively. For instance, FIG. 4 shows the web application and the You Tube application capable of searching for the information or multimedia identical to or associated with the first text 311 as functions inter-workable with the first text 311.

If the information indicator 320 corresponding to the web application is selected from the information indicators, referring to FIG. 4 (*c*), the controller 180 searches for the information 311A associated with the first text 311 via the web application and then displays the found information 311A. Subsequently, the controller 180 creates the information indicators 320 and 330 by the process mentioned in the foregoing description. If a drag or flicking touch having specific directionality is input to the document viewer screen 310 [FIG. 5 (*a*)], the controller 180 shifts the document viewer screen 310 in the direction corresponding to the drag or flicking touch and then displays the information indicators 320 and 330 on a region between an initial position of the document viewer screen 310 and the shifted position.

In particular, when the information indicator is displayed on the document viewer screen 310, the user may have difficulty in viewing the corresponding document due to the information indicator. Consequently, the information indicators 320 and 330 are usually hidden. Only if the document viewer screen 310 is dragged, the information indicators 320 and 330 are displayed. Thus, the display screen of the display unit 151 can be efficiently used.

Figure 6:
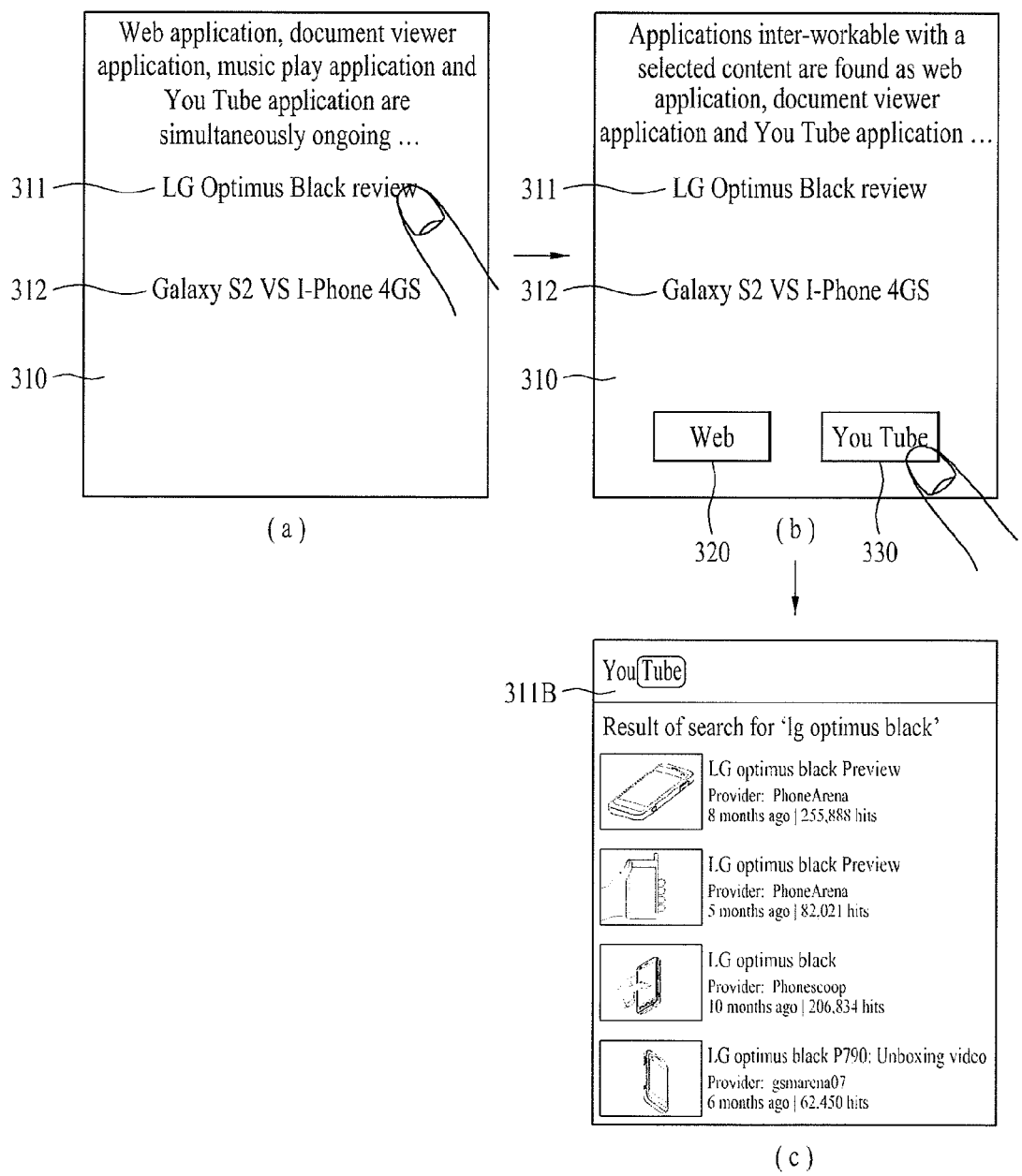

FIG. 6 shows one example of the steps S31 to S39 shown in FIG. 3. For instance, referring to FIG. 6 (*a*) and FIG. 6 (*b*), if a whole part of the first text 311 or a portion of the first text 311 is designated on a document viewer screen 310, the controller 180 displays information indicators 320 and 330 indicating the web application and the You Tube application inter-workable with the designated first text 311 among the simultaneously ongoing web, music play and You Tube applications, respectively.

If the information indicator 330 corresponding to the You Tube application is selected from the information indicators, referring to FIG. 6 (*c*), the controller 180 searches for multimedia associated with the first text 311 via the You Tube application and then displays a list of the found multimedia. Subsequently, if a command for a group setting of at least two of the currently active applications is input by a user [FIG. 7 (*a*)], the controller 180 recognizes the currently active applications and then displays a list 360 of the simultaneously ongoing functions [FIG. 7 (*b*)].

Figure 7:
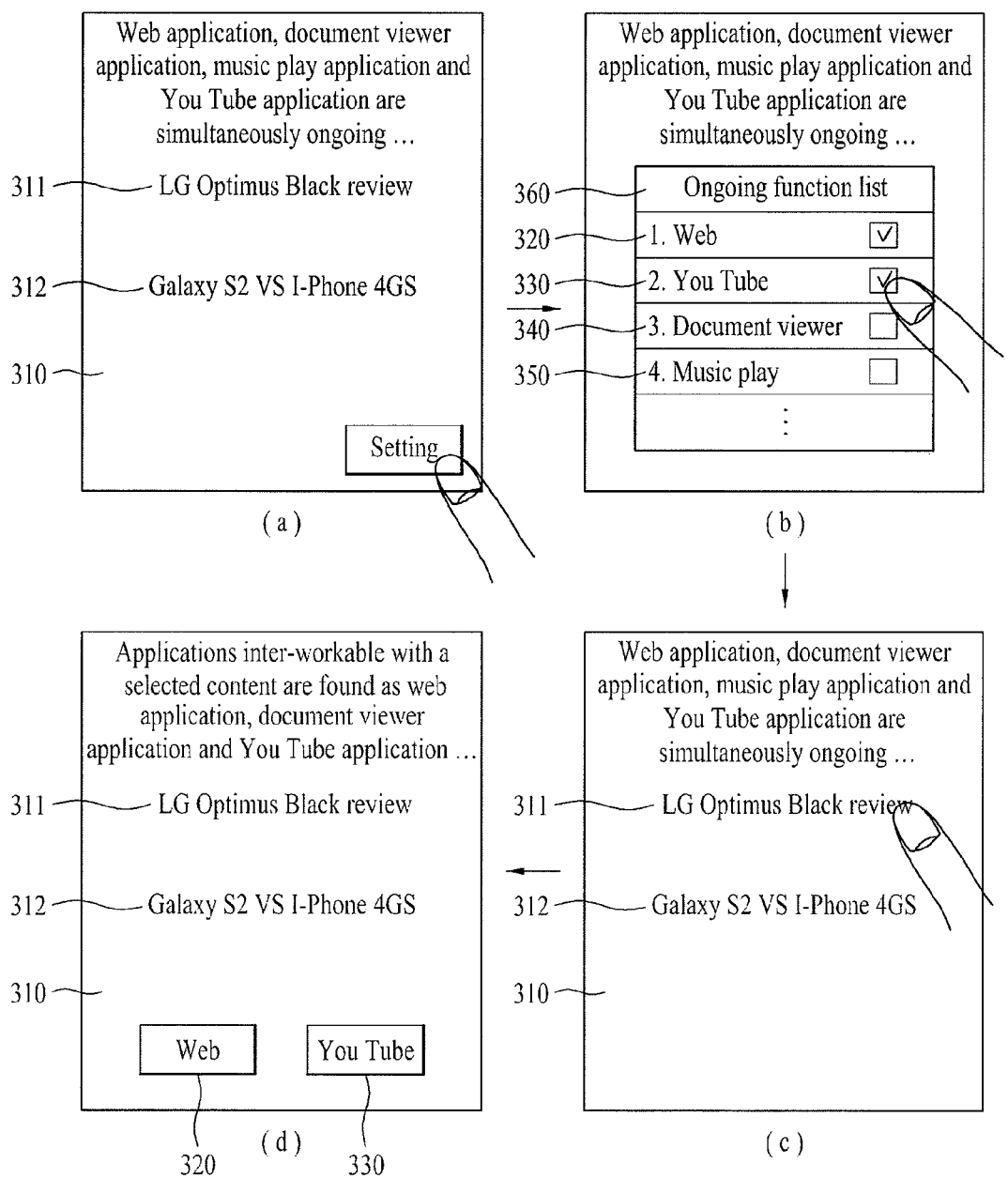

Referring to FIG. 7 (*b*), if at least two applications 320 and 330 are selected from the list 360, the controller 180 groups the selected functions 320 and 330 and then saves them in the memory 160. If a specific content 311 is selected from the document viewer screen 310 [FIG. 7 (*c*)], the controller recognizes applications belonging to the group set by the user among the currently active applications. Subsequently, referring to FIG. 7 (*d*), the controller 180 recognizes applications inter-workable with the selected content 311 from the recognized applications and then creates and displays information indicators 320 and 330 indicating the recognized applications, respectively.

Figure 8:
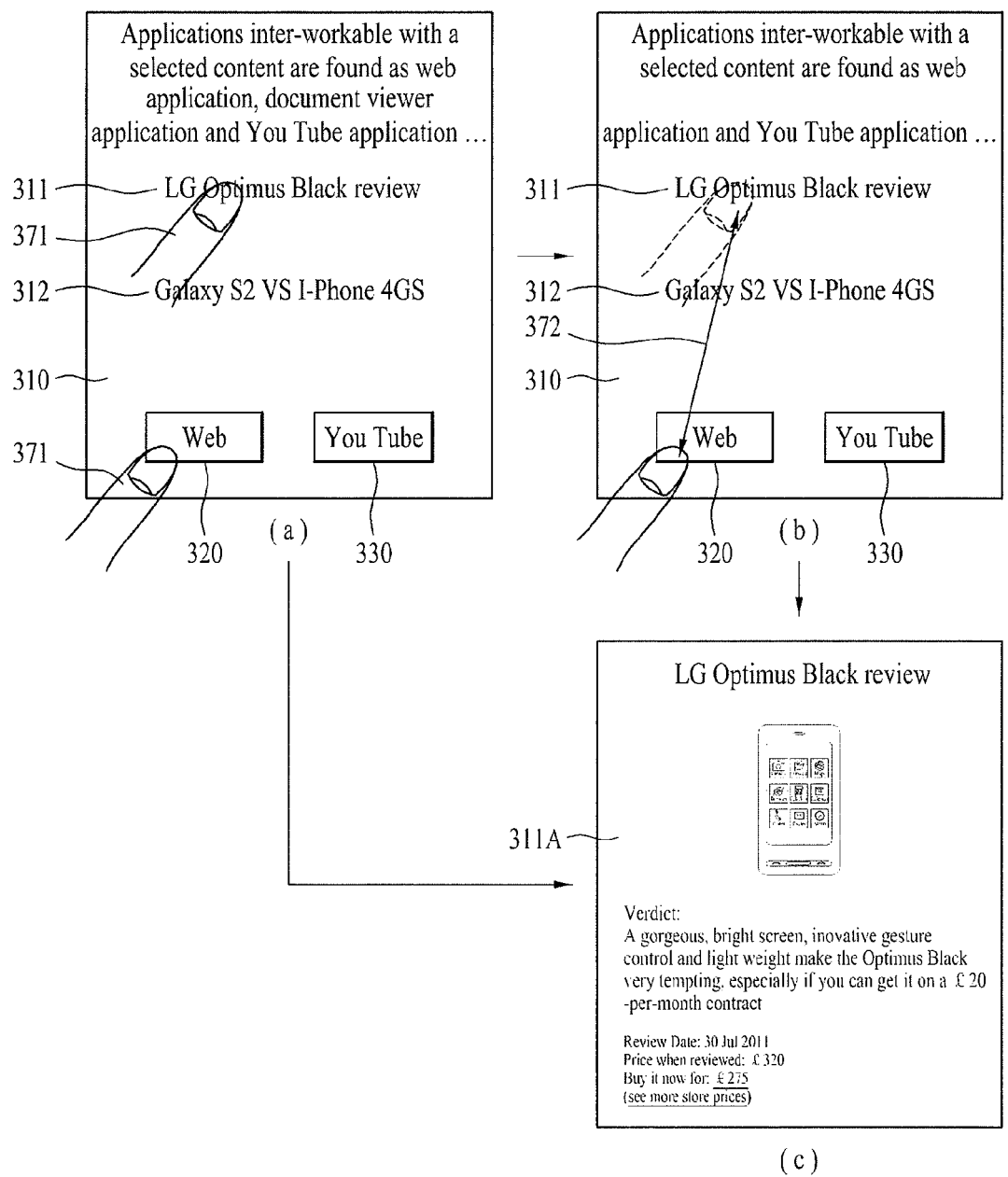

FIG. 8 shows one example of the steps S356 to S39 shown in FIG. 3. For instance, while the information indicators 320 and 330 indicating the applications inter-workable with the selected content 311 are displayed, if both of the first information indicator 320 corresponding to the application for activating the content 311 and the content 311 are simultaneously touched [FIG. 8 (*a*)], the controller 180 may by active the content 311 via the application (web) corresponding to the first information indicator 320 [FIG. 8 (*c*)].

For instance, referring to FIG. 8, because the content 311 includes the text 'LG Optimus Black' within the document viewer screen 310 and the function corresponding to the multi-touched first information indicator 320 is the web application, the controller 180 searches for the information associated with the text 'LG Optimus Black' via the web application and then displays a result of the search. For another instance, while the information indicators 320 and 330 indicating the applications inter-workable with the selected content 311 are displayed, if the content 311 is shifted to the display position of the first information indicator 320 by being dragged and dropped or the first information indicator 320 is shifted to the display position of the content 311 by being dragged and dropped [FIG. 8 (*b*)], the controller 180 may active the content 311 via the application (web) corresponding to the first information indicator 320 [FIG. 8 (*c*)].

Figure 9:
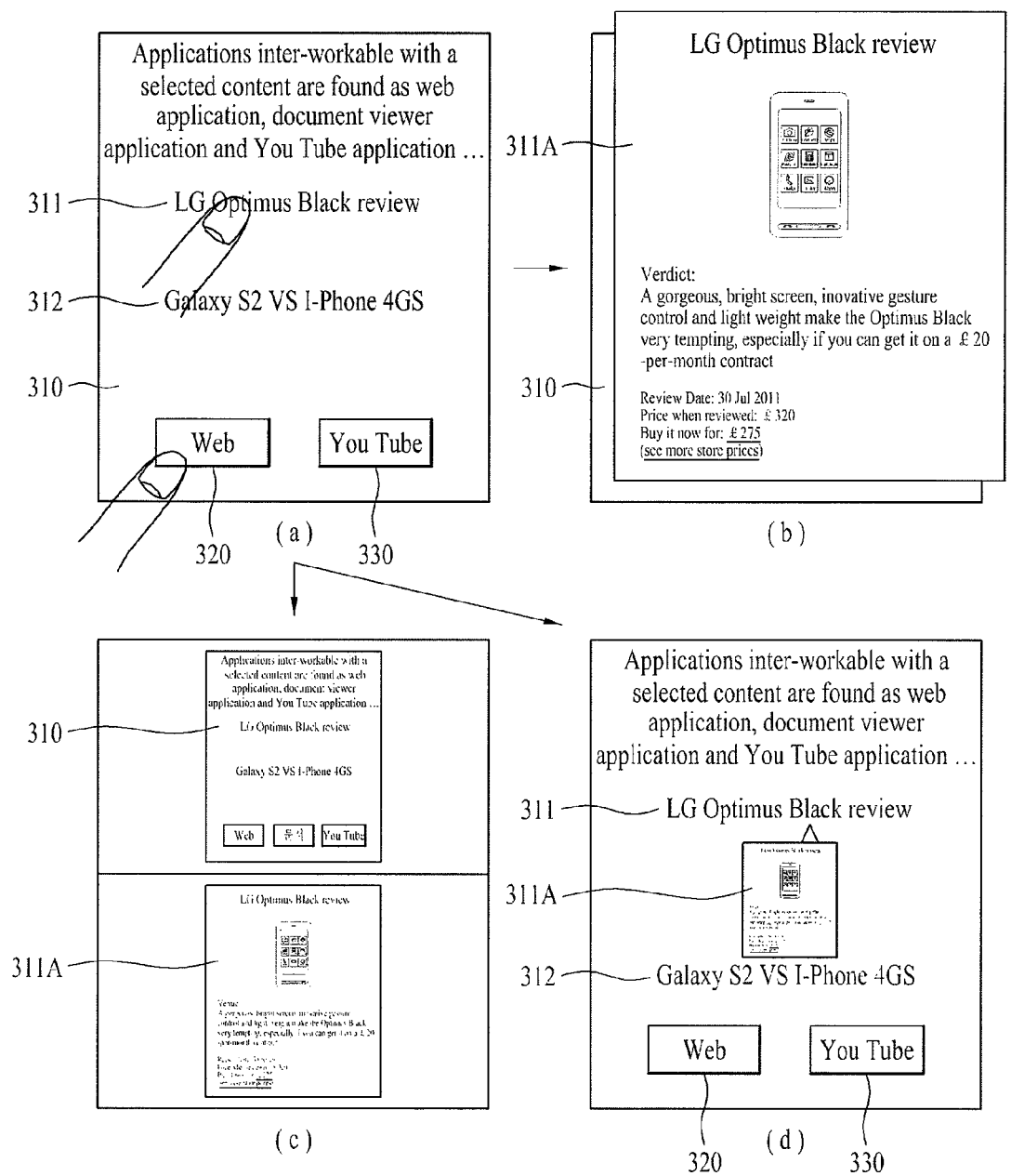

FIG. 9 shows one example of the step S39 shown in FIG. 3. For instance, if the text 'LG Optimus Black' 311 is selected from the document viewer screen 310 and the first information indicator 320 indicating the web application inter-workable with the text 'LG Optimus Black' 311 is selected, the controller 180 searches for the information associated with the text 'LG Optimus Black' 311 via the web application [FIG. 9 (*a*)]. Subsequently, the controller 180 may control a screen of the found information 311A to be further displayed as a new window on the document viewer screen 310 [FIG. 9 (b)].

Moreover, referring to FIG. 9 (c), the controller 180 partitions the screen of the display unit 151 into a first region and a second region and may be then able to display the document viewer screen 310 and the screen of the found information 311A on the first region and the second region, respectively.

Alternatively, referring to FIG. 9 (d), the controller 180 reduces the found information 311A into a thumbnail and may display the thumbnail at or around a display position of the text 'LG Optimus Black" 311. In doing so, if the information 311A displayed as the thumbnail is selected, the information 311A may be displayed on the screen by pull-up.

Figure 10:
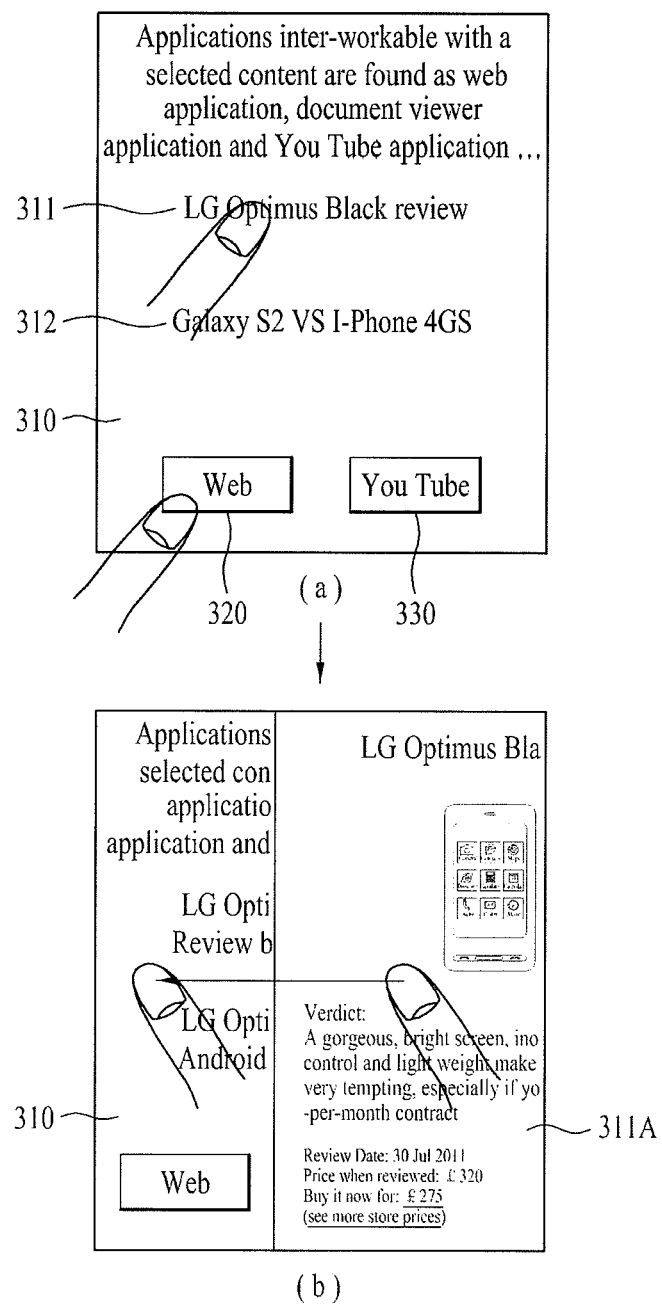

For another instance, referring to FIG. 10 (a), if the text 'LG Optimus Black' 311 is selected from the document viewer screen 310 and the first information indicator 320 indicating the web application inter-workable with the text 'LG Optimus Black' 311 is selected, the controller 180 searches for the information associated with the text 'LG Optimus Black' 311 via the web application. Subsequently, referring to FIG. 10 (b), if a drag or flicking touch having specific directionality is input to the document viewer screen 310, the controller 180 shifts the document viewer screen 310 in a direction corresponding to the drag or flicking touch and may be then able to control the found information 311A to be displayed on a region between the initial position of the document viewer screen 310 and the shifted position.

Figure 11:
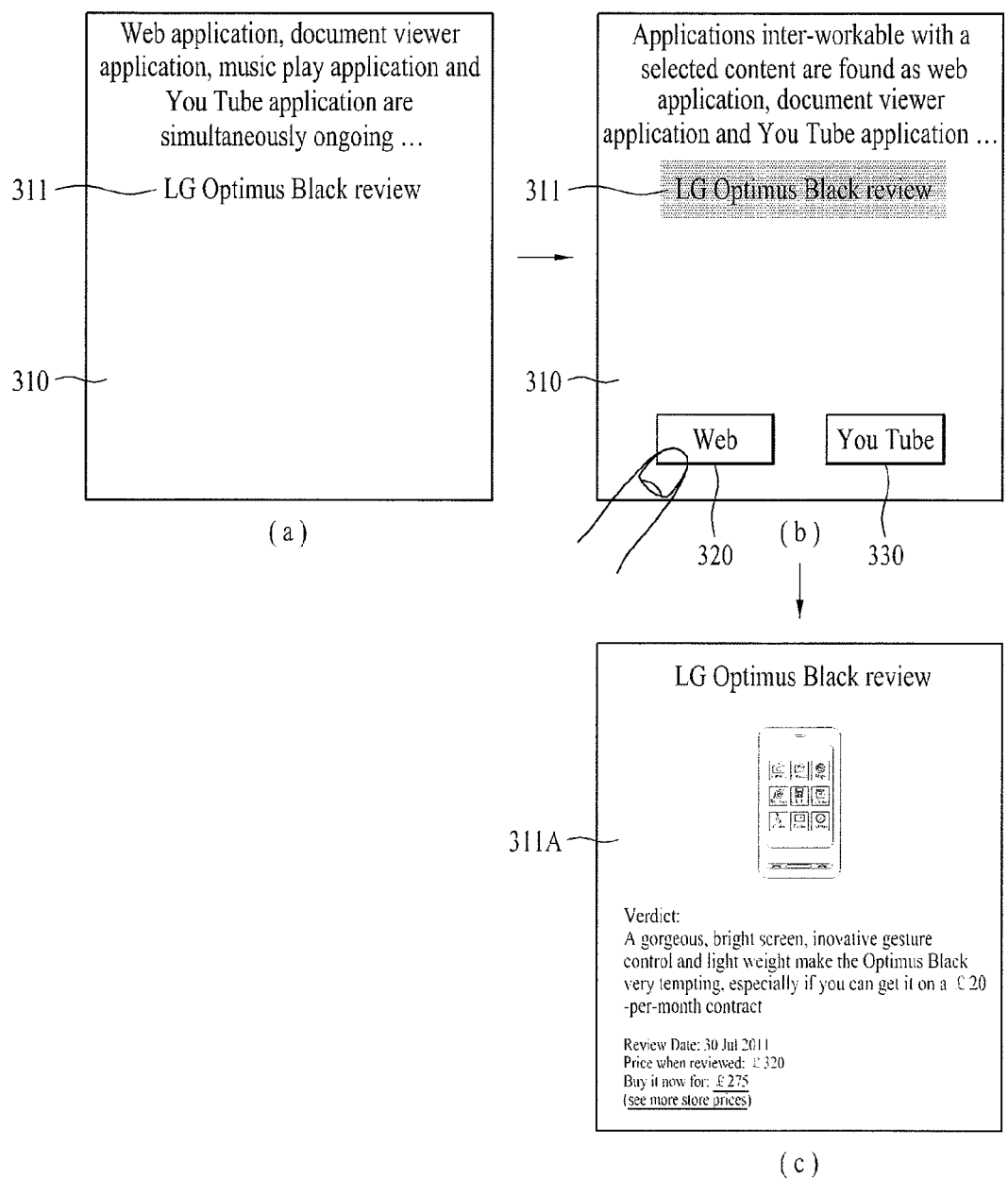
Figure 12:
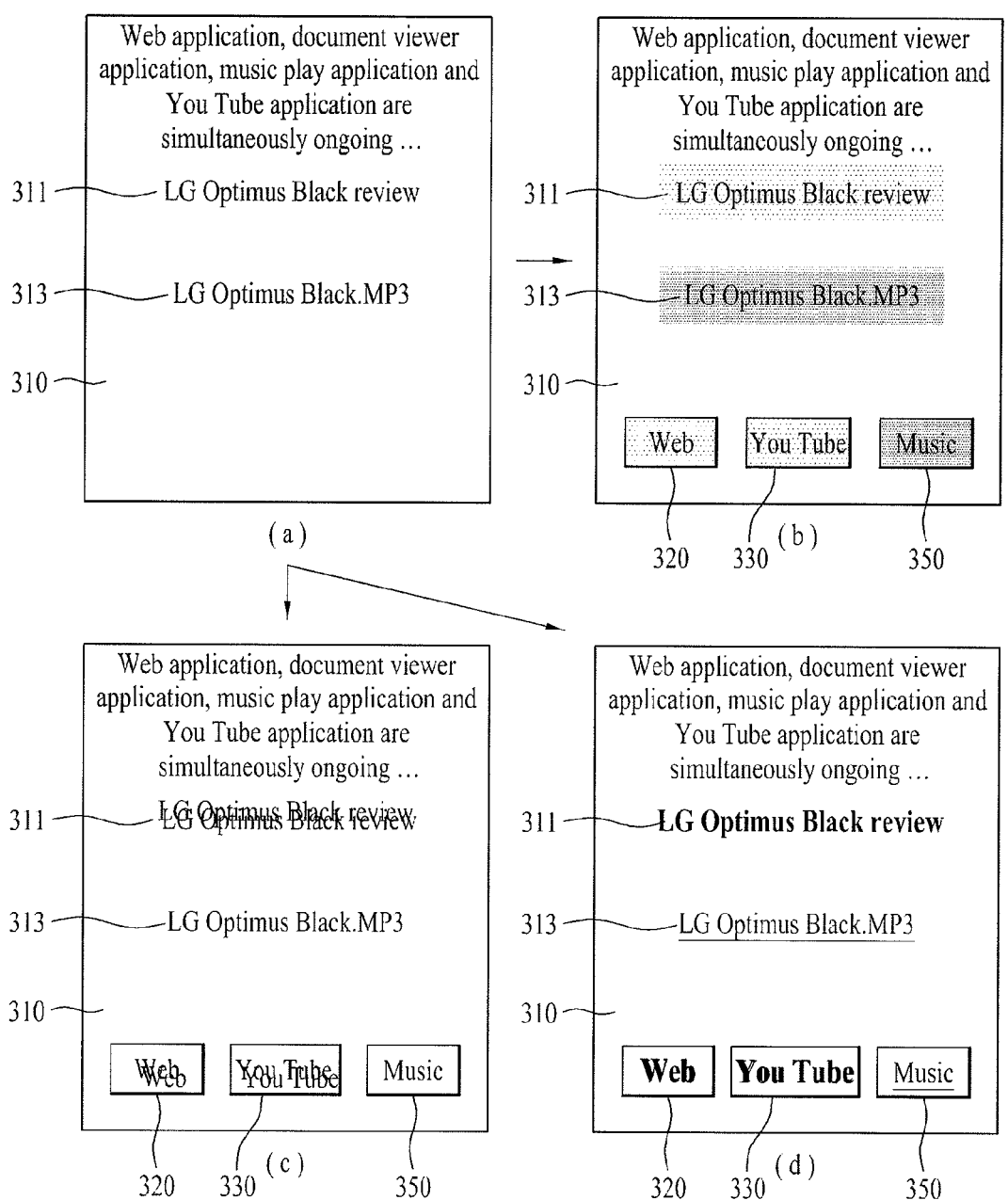

Meanwhile, referring to FIG. 11 and FIG. 12, while the screen of the specific one of the currently active applications is displayed, the controller 180 checks whether content inter-workable with the currently active applications exist among the contents included in the active screen of the specific application instead of or prior to performing the steps S32 and S33 shown in FIG. 3. Subsequently, the controller 180 controls the checked contents to be identifiably displayed within the active screen of the specific application. In doing so, the controller 180 controls the checked contents to be displayed in a style different from that of the active screen of the specific application. Hence, when a user views the active screen of the specific application, the checked contents can be quickly identifiable through user's eyes. For instance, the controller 180 may display the checked contents by highlighting them, by blinking them, by displaying them in a color different from that of other contents or the active screen of the specific application, by displaying the contents in 3D (3 dimensions) while displaying other contents in 2D (2 dimensions), by underlining them and/or enlarging them. Subsequently, the controller 180 creates information indicators indicating applications inter-workable with the checked contents, respectively, and then displays the created information indicators. The controller 180 performs the operations corresponding to the steps S36 to S39 shown in FIG. 3.

In doing so, if the first content and the first information indicator is inter-workable with each other among the checked contents and the information indicators and the second content and the second information indicator is inter-workable with each other, the controller 180 applies the same display style to the first content and the first information indicator to be identifiable from other contents and other information indicators within the active screen of the specific application and also applies the same display style to the second content and the second information indicator to be identifiable from other contents and other information indicators within the active screen of the specific application.

Thus, if the same display style is applied to the corresponding content and the corresponding information indicator, a user can easily understand that the content and information indicator having the same display style applied thereto are inter-workable with each other when recognizing the display style of the corresponding content and information indicator within the current screen. For instance, the controller controls the first content and the first information indicator to be displayed in red background color and also controls the second content and the second information indicator to be displayed in blue background color, thereby facilitating them to be identified from each other.

Referring to FIG. 11 (a), simultaneously ongoing applications include a web application, a document viewer application, a music play application and a You Tube application. In this instance, the application currently displayed on the screen is the document viewer application including at least one text 311. If the first text 311 within the document viewer screen 310 is inter-workable with at least one of the simultaneously ongoing applications, referring to FIG. 11 (b), the controller 180 controls the first text 311 to be identifiably displayed within the document viewer screen 310.

For instance, FIG. 11 (b) shows that the first text 311 is identifiable within the document viewer screen 310 by being highlighted. Subsequently, the controller 180 displays information indicators 320 and 330 indicating the applications inter-workable with the first text 311 among the currently active applications.

For instance, FIG. 11 shows the web application and the You Tube application, each of which is capable of searching for information or multimedia identical to or associated with the first text 311, as functions inter-workable with the first text 311. If the information indicator 320 corresponding to the web function is selected from the information indicators, referring to FIG. 11 (c), the controller 180 searches for the information 311A associated with the first text 311 via the web function and then displays the found information 311A.

FIG. 12 (a) shows a document viewer screen 310 including at least two texts including a first text 311 and a second text 312. In this instance, the controller 180 recognizes applications inter-workable with each of the first text 311 and the second text 312 from simultaneously ongoing applications.

For instance, FIG. 12 shows that the recognized applications inter-workable with the first text 311 include the web application and the You Tube application and that the recognized application inter-workable with the second text 312 includes the music play application. In doing so, referring to FIGS. 12 (b) to 12 (d), the controller 180 gives the same display style to the first text 311 and the corresponding information indicators 320 and 330 in order for both of the information indicators 320 and 330 indicating the applications inter-workable with the first text 311 to be identifiable within the document viewer screen 310 together.

Moreover, referring to FIGS. 12 (b) to 12 (d), the controller 180 gives the same display style to the second text 312 and the corresponding information indicator 330 in order for the information indicator 330 indicating the functions inter-workable with the second text 312 to be identifiable within the document viewer screen 310 together. For instance, referring to FIG. 12 (b), the controller gives highlights of a first color to the first text 311 and the corresponding information indicators 320 and 330 and also gives highlights of a second color different from the first color to the second text 312 and the corresponding information indicator 330.

Referring to FIG. 12 (c), the controller 180 controls the first text 31 and the corresponding information indicators 320 and 330 to be displayed in 3D and also controls the second text 312 and the corresponding information indicator 330 to be displayed in 2D. Referring to FIG. 12 (d), the controller 180 controls the first text 311 and the corresponding information indicators 320 and 330 to be displayed in bold font and also controls the second text 312 and the corresponding information indicator 330 to be displayed by being underlined.

Figure 13:
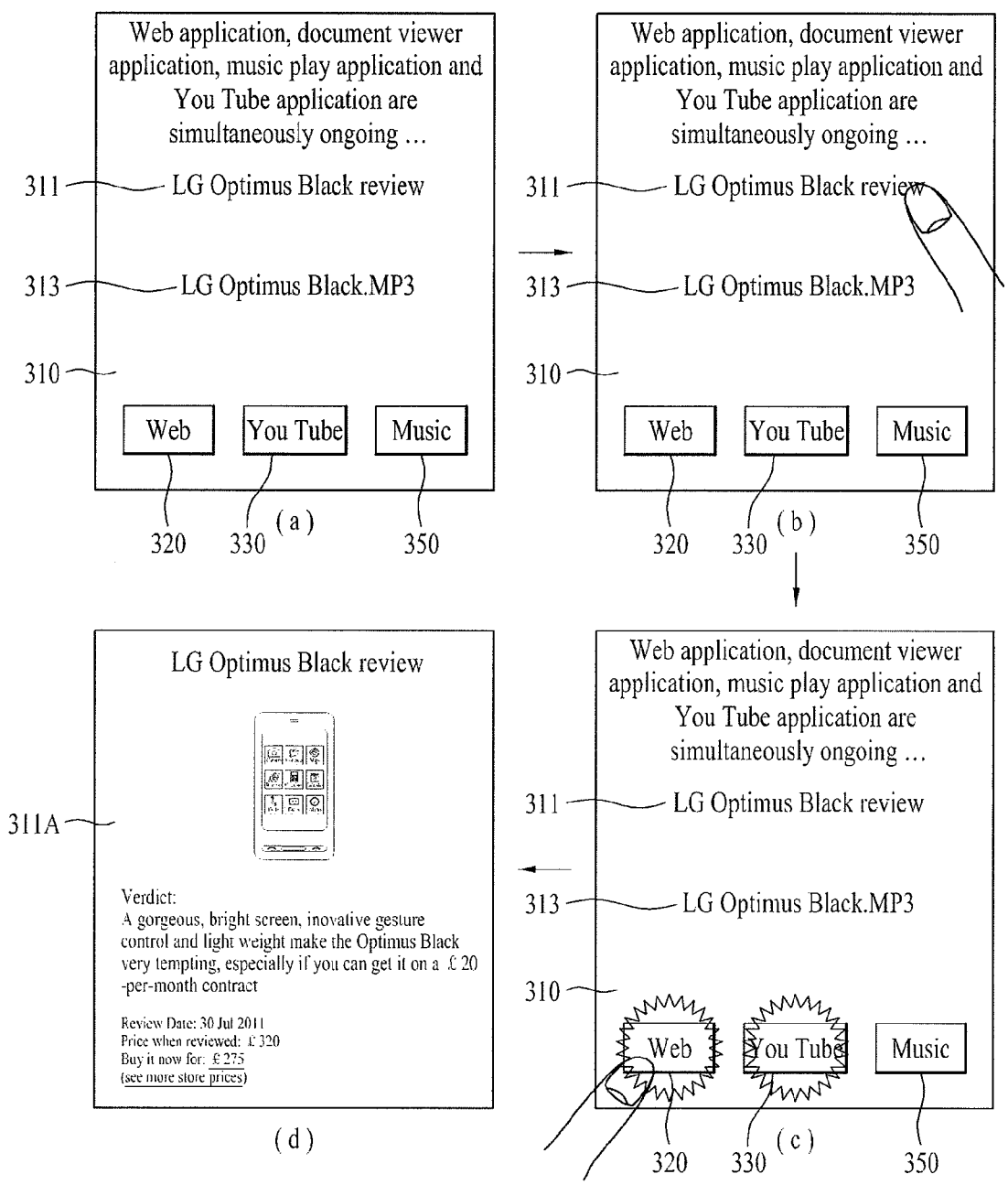

Referring to FIG. 13, while an active screen of a specific one of currently active applications is displayed, the controller 180 displays information indicators indicating the active applications prior to performing the steps S32 and S33 shown in FIG. 3. If at least one content is selected from contents included in the active screen of the specific application, the controller 180 recognizes at least one or more applications inter-workable with the selected content from the currently active applications except the specific application.

The controller 180 displays the information indicators corresponding to the recognized applications in a manner that they are identifiable from the rest of the information indicators. Desirably, the controller 180 controls the information indicators corresponding to the recognized applications to be displayed in a display style different from that of the rest of the information indicators. For instance, the controller 180 displays the information indicators corresponding to the recognized applications to be identifiable from the rest of the information indicators in a manner that the information indicators corresponding to the recognized applications are blinked or highlighted in specific color. Alternatively, the controller 180 displays the information indicators corresponding to the recognized applications to be identifiable from the rest of the information indicators by displaying the information indicators corresponding to the recognized applications in 3D and displaying the rest of the information indicators in 2D. In yet another alternative, the controller displays the information indicators corresponding to the recognized applications to be identifiable from the rest of the information indicators by enlarging the information indicators corresponding to the recognized applications.

Moreover, the controller 180 creates guide information for guiding a user to select the information indicators corresponding to the recognized applications and then displays the created guide information, thereby guiding the user to select information indicators corresponding to applications inter-workable with a content currently selected by the user. For instance, the guide information may include an arrow indicating the corresponding information indicator at a display position of the selected content.

Subsequently, the controller 180 performs the same steps S36 to S39 shown in FIG. 3. Referring to FIG. 13 (a), simultaneously ongoing applications correspond to a web function, a document viewer function, a music play function and a You Tube function. In this instance, the application currently displayed on the screen is the document viewer function including at least two texts 311 and 313. If the document viewer screen 310 is displayed, the controller 180 displays information indicators 320, 330 and 340 respectively indicating the simultaneously ongoing application within the document viewer screen 310.

While the information indicators 320, 330 and 340 are displayed, if a whole part of the first text 311 or a portion of the first text 311 within the document viewer screen 310 is designated [FIG. 13 (b)], the controller 180 controls the information indicators 320 and 330, which correspond to the applications inter-workable with the selected first text 31 among the information indicators 320, 330 and 340, to be displayed by being identifiable from the remaining information indicator 340. In particular, a user can recognize the applications inter-workable with the content selected by the user by viewing the identifiably displayed information indicators 320 and 330. If the information indicator 320 corresponding to the web application is selected from the identifiably displayed information indicators 320 and 330, referring to FIG. 13 (d), the controller 180 searches for the information 311A associated with the selected first text 311 via the web application corresponding to the selected information indicator 320 and then displays the found information 311A.

In the following descriptions with reference to FIGS. 14 to 30, the controller 180 activates at least two or more applications, displays a specific screen and then displays a user interface (UI), to which functions of managing operations of the ongoing applications are assigned, prior to performing the steps S32 and S33 shown in FIG. 3. In doing so, the specific screen may include the active screen of the specific application mentioned in the description with reference to FIGS. 3 to 13 or a home screen. In the following description, the specific screen is assumed as the home screen.

In particular, the UI provides a function of collectively controlling the same operations of the applications in the course of multi-tasking and a function of individually controlling a different operation of each of the functions. The operation control functions of the UI shall be described in detail with reference to FIG. 22 and FIG. 23 later. The UI may continue being displayed on the display unit 151 like the information indicator despite that information displayed on the display unit 151 changes.

If a touch gesture of a preset type is input to the home screen, the UI may be displayed on the home screen. In particular, if a touch gesture, to which a function of paging the UI is assigned, is saved in the memory 160 and then input to the home screen, the controller 180 may display the UI on a current home screen. In doing so, the UI paging function assigned touch gesture may be configured by a user or may be set as a default in the memory 160.

If the displayed UI is selected in a preset manner, the controller 180 checks currently active applications and then displays information indicators respectively indicating the checked applications on the home screen. For instance, if the UI is long touched, the controller 180 displays the information indicators indicating the currently active applications.

The information indicators may be shifted on the home screen. The information indicators may be fixed to a prescribed position on the home screen in accordance with a user's touch manipulation. The information indicators may be sorted for arrangement in accordance with a user's touch manipulation. The information indicators may be deleted in accordance with a user's touch manipulation. If at least two information indicators to be managed via the UI among the displayed information indicators are registered, the controller 180 displays the registered information indicators by sorting or arranging them within or around the UI. If the at least two information indicators to be managed via the UI among the displayed information indicators are shifted into the UI by being dragged and dropped, the controller 180 recognizes the shifted information indicators as information indicators to be registered in the UI. If a multi-touch between the UI and the information indicators to be registered is input, the controller 180 may recognize the information indicators in accordance with the multi-touch input as information indicators to be registered in the UI. Moreover, if each of the information indicators to be registered is selected, the controller 180 may recognize the selected information indicator as the information indicator to be registered in the UI.

Meanwhile, the controller 180 may control the information indicators to be displayed within or around the UI by being sorted or arranged in order of activating the applications corresponding to the information indicators. For instance, the information indicators of the corresponding applications are sorted and displayed in order of being early activated.

While the information indicators are displayed within the UI, the controller 180 may display the information indicators within the UI by re-sorting or rearranging them in accordance with use counts of applications corresponding to the information indicators, respectively. For instance, while the information indicators are displayed within the UI, if a specific application is most frequently used, the information indicator corresponding to the specific application displayed by being arranged at the foremost part.

Meanwhile, if a preset touch gesture is input to the home screen before the UI is displayed, the controller 180 displays the information indicators in the first place. If at least two information indicators are selected from the displayed information indicators, the controller 180 may display a UI with which the selected information is registered. Subsequently, if a command for managing operations of the applications corresponding to the information indicators registered in the UI is input via the UI by a user, the controller 1809 controls operations of the applications corresponding to the information indicators registered in the UI by the input command.

Figure 14:
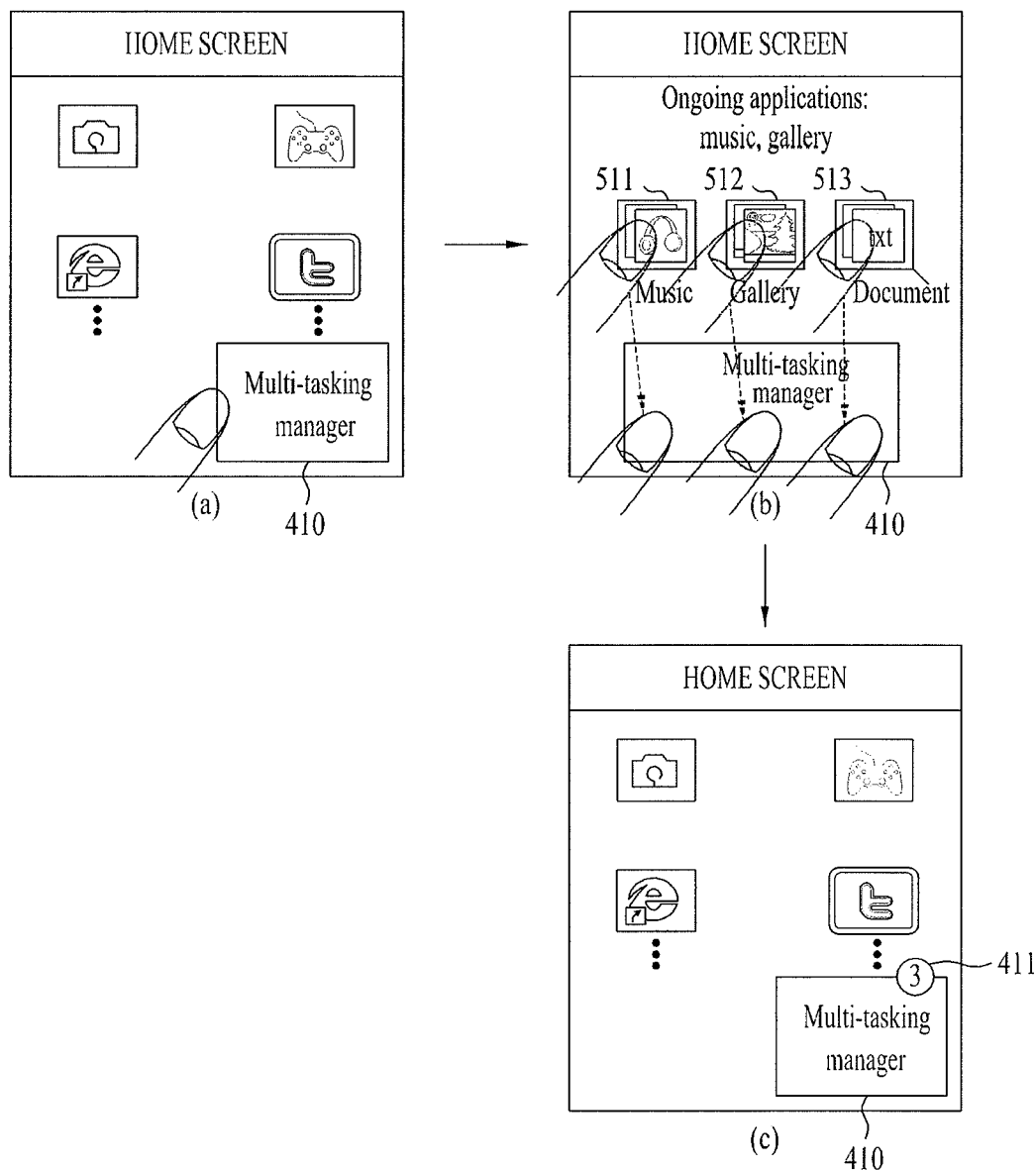

Referring to FIG. 14 (*a*), a specific screen having the UI displayed thereon is a home screen including a plurality of application icons. A UI 'multi-tasking manager' 410 is displayed on the home screen. In the following description with reference to FIGS. 14 to 30, assume that a music application, a gallery application and a document application are currently in a multi-tasking state.

If the UI 410 within the home screen 9*s* selected in a preset manner, referring to FIG. 14 (*b*), the controller 180 displays a first information indicator 511 indicating the currently multi-tasked music application, a second information indicator 512 indicating the currently multi-tasked gallery application and a third information indicator 513 indicating the currently multi-tasked document application. In doing so, if the UI 410 is long touched, the controller 180 may display the first to third information indicators 511 to 513. Subsequently, if each of the first to third information indicators 511 to 513 is shifted into the UI 410 to be registered therein, the controller 180 recognizes the shifted first to third information indicators 511 to 513 as information indicators to be registered in the UI 410 and then registers the shifted first to third information indicators 511 to 513 in the UI 410 [FIG. 14 (*c*)]. In doing so, referring to FIG. 14 (*c*), the controller 180 may display the number information 411, which indicates the number of the information indicators 511 to 513 registered in the UI 410, on the UI 411.

Meanwhile, if the first information indicator 511 and the UI 410 are simultaneously touched, the controller 180 may register the first information indicator 511 in the UI 410. In particular, if a multi-touch between the UI 410 and each of the information indicators corresponding to the applications to be registered is input, the controller 180 controls the corresponding information indicator in accordance with the multi-touch input to be registered in the UI 410.

While the UI 410 is not displayed on the home screen, if a preset touch gesture is input to the home screen, the controller 180 displays the first to third information indicators 511 to 513. Although the UI 410 is not displayed, if at least one of the first to third information indicators 511 to 513 is selected to be registered with the UI 410, referring to FIG. 14 (*c*), the controller 180 may display the UI 410 including the selected at least one information indicator.

Figure 15:
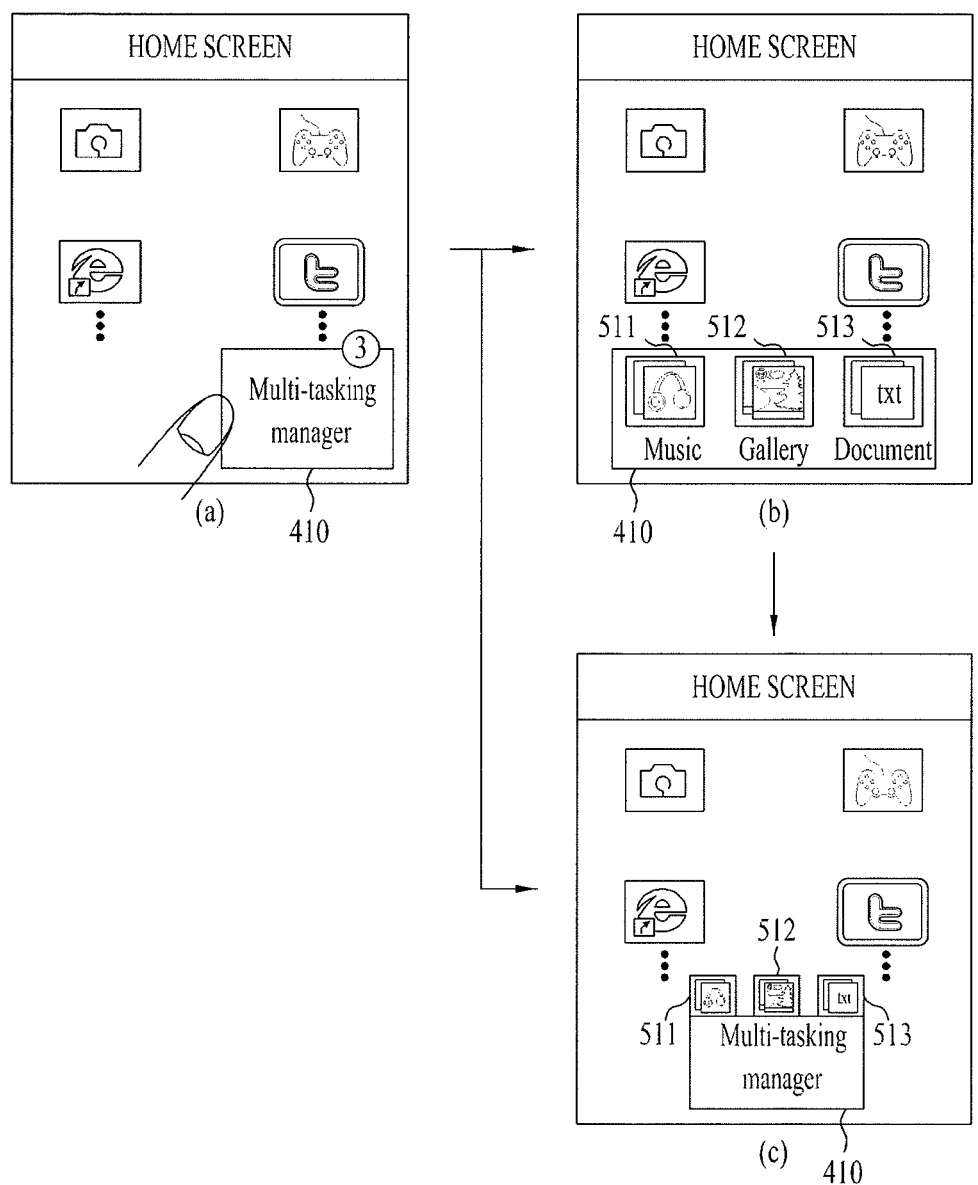

FIG. 15 (*a*) shows the UI 410 with which the first to third information indicators 511 to 513 are registered by the process shown in FIG. 14. If the UI 410, with which the first to third information indicators 511 to 513 are registered, is selected, referring to FIG. 15 (*b*) or FIG. 15 (*c*), the controller 180 may display the registered first to third information indicators 511 to 513 in a manner that the first to third information indicators 511 to 513 are aligned within the UI 410 or around the outer edge of the UI 410. In particular, referring to FIG. 15 (*b*), the controller 180 may display the first to third information indicators 511 to 513 in a manner that the first to third information indicators 511 to 513 are aligned within the UI 410. In particular, referring to FIG. 15 (*c*), the controller 180 may display the first to third information indicators 511 to 513 in a manner that the first to third information indicators 511 to 513 are aligned in the vicinity of the edge of the UI 410.

In more detail, referring to FIG. 15 (*b*) or FIG. 15 (*c*), the controller 180 may display the first to third information indicators 511 to 513 in a manner that the first to third information indicators 511 to 513 are aligned in order of the time of the registration with the UI 410. In more detail, the controller 180 may display the first to third information indicators 511 to 513 in a manner that the first to third information indicators 511 to 513 are aligned in order of the time of activation of the applications (e.g., music application, gallery application, document application, etc.) corresponding to the first to third information indicators 511 to 513.

Figure 16:
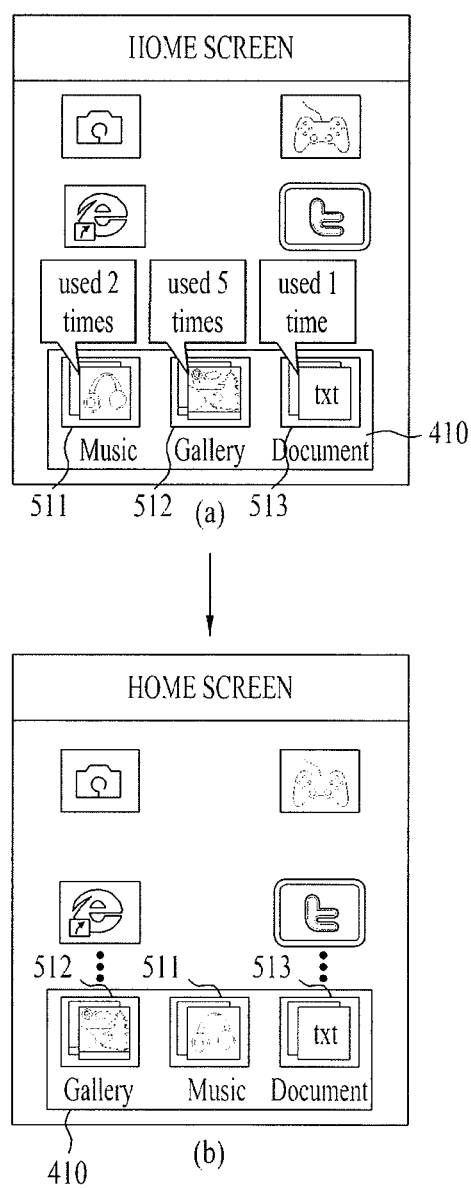

FIG. 16 (*a*) shows that the first to third information indicators 511 to 513 are displayed by being aligned within the UI 410 or on the outer edge of the UI 410 by the process shown in FIG. 15. In doing so, while the first to third information indicators 511 to 513 are registered with the UI 410, the controller 180 may periodically check the activated count of the application corresponding to each of the first to third information indicators 511 to 513. In this instance, the activation count may mean the count for a user to use the application corresponding to each of the first to third information indicators 511 to 513 while the first to third information indicators 511 to 513 are registered with the UI 410. Alternatively, the activation count may mean the count for a user to switch a current screen to an active screen of the application corresponding to each of the first to third information indicators 511 to 513.

Referring to FIG. 16 (*b*), the controller 180 may display the first to third information indicators 511 to 513 by re-aligning the first to third information indicators 511 within the UI 410 or on the outer edge of the UI 410 to 513 in higher order of the checked activation count. For instance, referring to FIG. 16 (*a*), the music application corresponding to the first information indicator 511 is used '2 times', the gallery application corresponding to the second information indicator 512 is used '5 times', and the document application corresponding to the third information indicator 513 is sued '1 time'. Also, referring to FIG. 16 (*b*), the first to third information indicators 511 to 513 are displayed by being re-aligned in the higher order of use.

Figure 17:
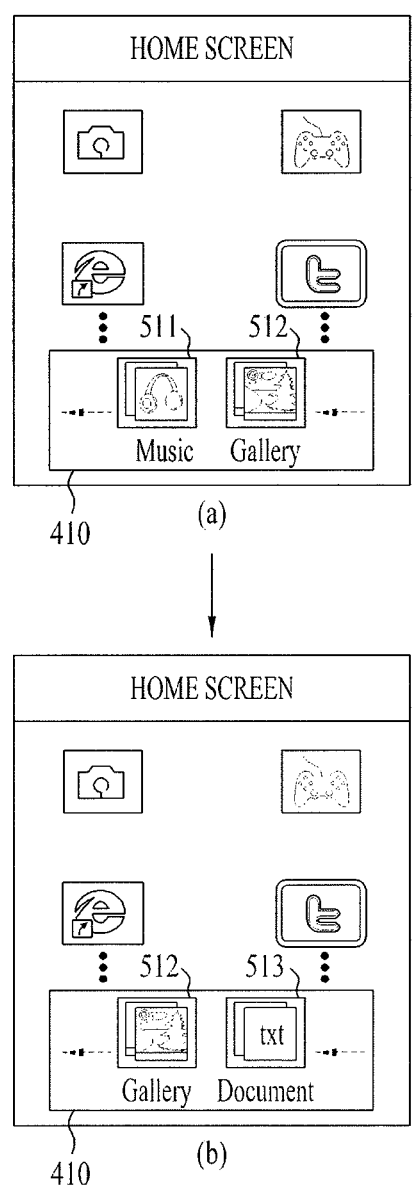

When a plurality of information indicators is registered in the UI 410, if it is impossible to display all the information indicators within or on the outer edge of the UI 410, FIG. 17 shows a process for displaying the information indicators within or on the outer edge of the UI 410 by scrolling the corresponding information indicators. Referring to FIG. 17 (a) and FIG. 17 (b), the controller 180 checks whether all the information indicators registered with the UI 410 are displayable within a display area of the UI 410. If all the information indicators are not displayable, the controller 180 controls some of the registered information indicators to be displayed in the first place and then controls the rest of the information indicators to be displayed by being scrolled.

Figure 18:
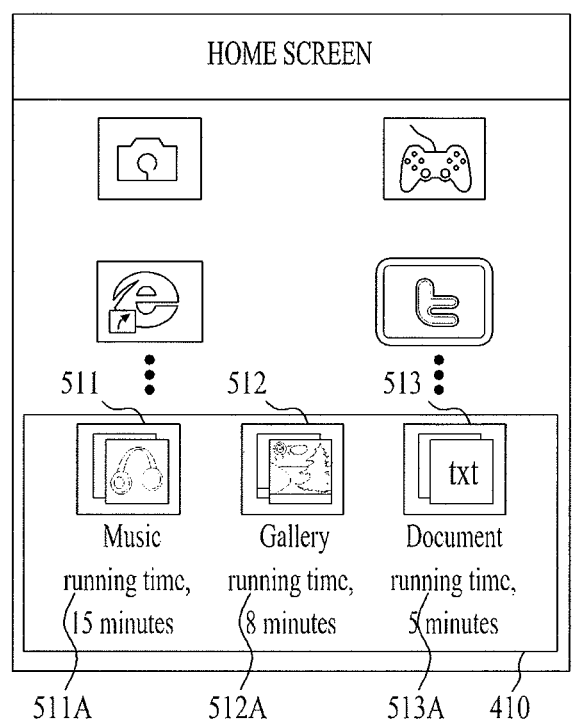

Once the first to third information indicators 511 to 513 are registered in the UI 410, FIG. 18 shows a process for providing time information indicating a running time of each of the applications corresponding to the first to third information indicators 511 to 513 with reference to a time of registering each of the first to third information indicators 511 to 513 with the UI 410. In particular, if each of the first to third information indicators 511 to 513 is registered in the UI 410 in different time order, the controller 180 checks the running times of the applications corresponding to the first to third information indicators 511 to 513 with reference to the times of registering the first to third information indicators 511 to 513 with the UI 410, respectively and then controls time information 511A, 512A and 513A indicating the running times of the application to be displayed on the first to third information indicators 511 to 513, respectively.

For instance, referring to FIG. 18, the music application corresponding to the first information indicator 511 is currently running 15 minutes, the gallery application corresponding to the second information indicator 512 is currently running 8 minutes, and the document application corresponding to the third information indicator 513 is currently running 5 minutes.

Figure 19:
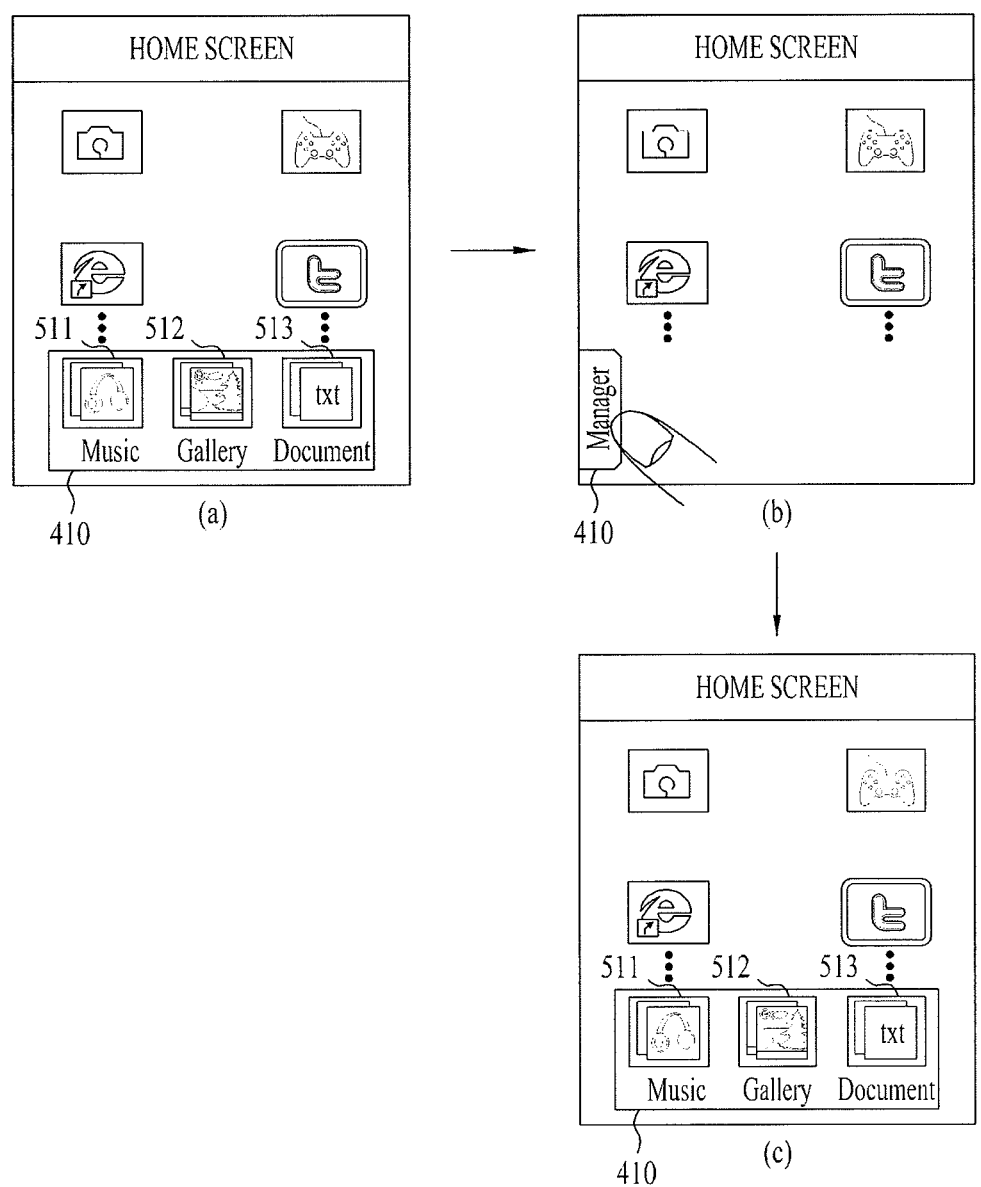

FIG. 19 shows a process for reducing and displaying the UI 410, with which the first to third information indicators 511 to 513 are registered, on a current screen. Referring to FIG. 19 (a), the first to third information indicators 511 to 513 are registered in the UI 410. In doing so, referring to FIG. 19 (b), the controller 180 may display the UI 410 on a partial side of the current home screen by reducing the UI 410. In particular, the controller 180 may control a name of the UI 410 to be displayed on the partial side of the home screen. If the reduced UI 410 is selected, referring to FIG. 19 (c), the controller 180 may control the first to third information indicators 511 to 513 registered with the UI 410 to be displayed again. After the UI 410 including the first to third information indicators 511 to 513 has been re-displayed, if the UI 410 is not used until expiration of preset duration, referring to FIG. 19 (b), the controller 180 may control the UI 410 to be displayed on the partial side of the home screen by being reduced again.

Figure 20:
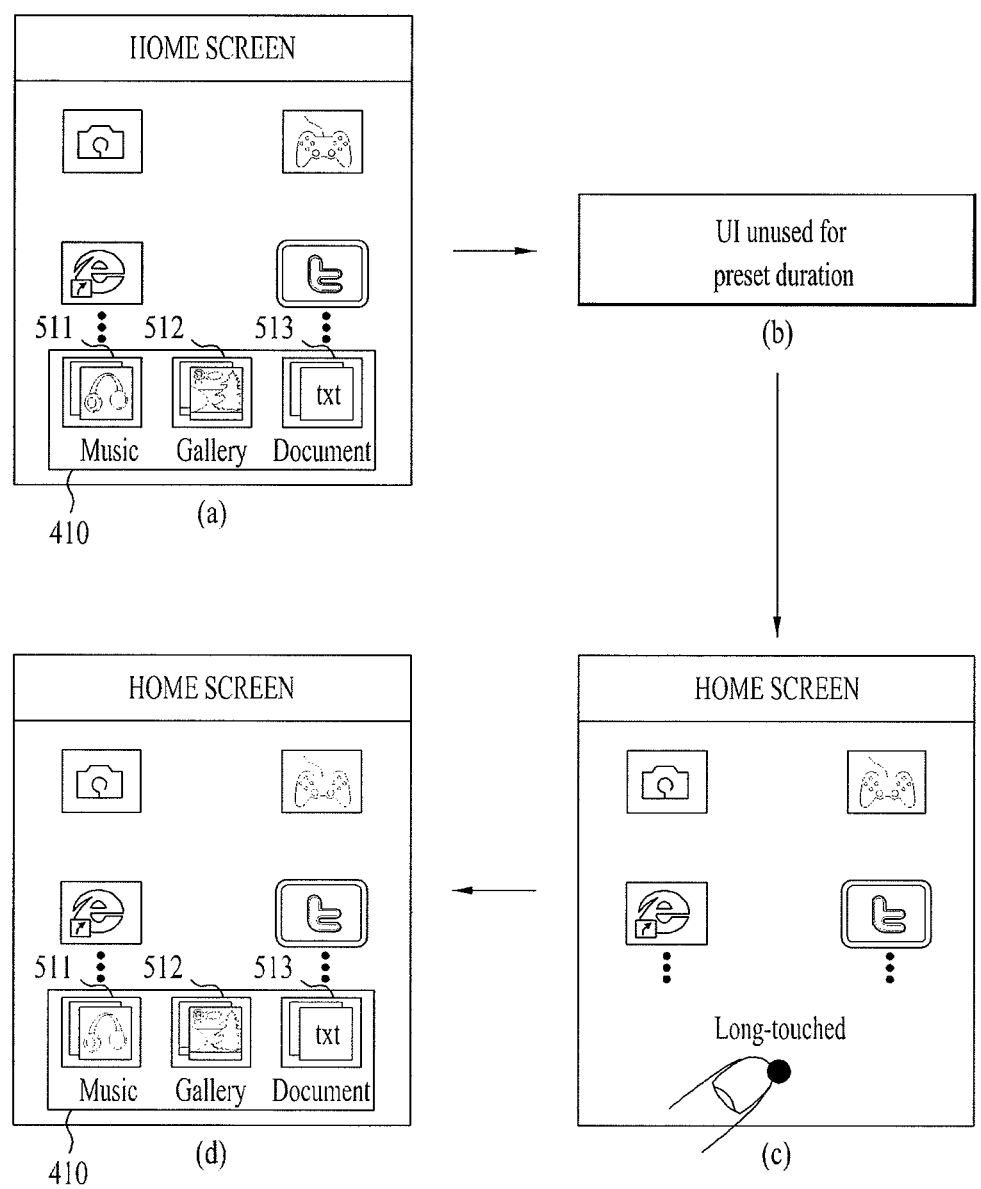

FIG. 20 shows a process for displaying the UI 410 having the first to third information indicators 511 to 513 registered therein on a current screen in a manner hiding the UI 410 from a current screen. Referring to FIG. 20 (a), the first to third information indicators 511 to 513 are registered in the UI 410. In doing so, while the UI 410 including the first to third information indicators 511 to 513 is displayed [FIG. 20 (b)], if the UI 410 is not used until the expiration of preset duration, the controller 180 may control the UI 410 to be displayed by being hidden from the home screen [FIG. 20 (c)]. If a command (e.g., a long-touch to a specific region of the home screen) is input to re-display the hidden UI 410, referring to FIG. 20 (d), the controller 180 may control the hidden UI 410 to be re-displayed on the home screen.

Figure 21:
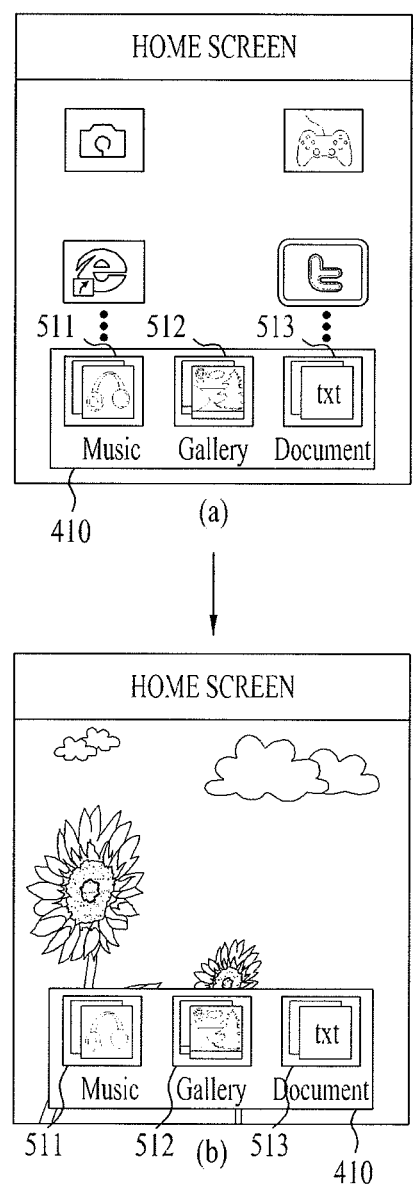

While the first to third information indicators 511 to 513 are registered within the UI 410, FIG. 21 shows a process for continuing displaying the UI 410 despite that information displayed on a screen of the display unit 151 changes. Referring to FIG. 21 (a), the first to third information indicators 511 to 513 are registered in the UI 410. In doing so, referring to FIG. 21 (b), even if a current home screen is switched to an active screen of a specific function in accordance with a user's manipulation, the controller 180 may keep displaying the UI 410 including the first to third information indicators 511 to 513. For instance, referring to FIG. 21 (b), even if the home screen is switched to an active screen of the application among the simultaneously ongoing applications, the controller 180 controls the UI 410 previously displayed on the home screen to keep being displayed on the active screen of the gallery application.

Figure 22:
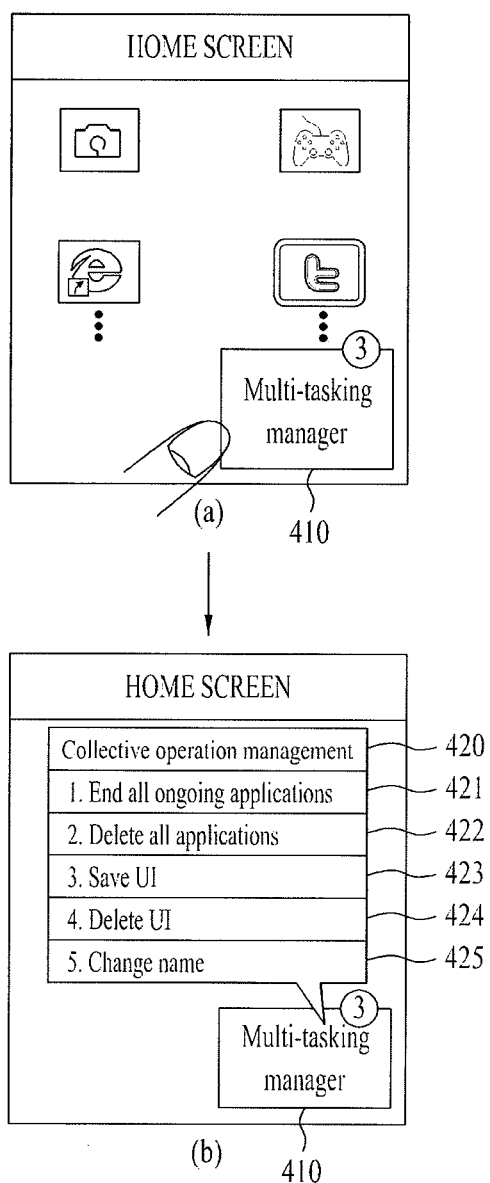

FIG. 22 shows a process for collectively controlling the same operation of the applications corresponding to the first to third information indicators 511 to 513 registered in the UI 410. Referring to FIG. 22, if the UI 410 is selected [FIG. 22 (a)], the controller 180 displays a first operation control menu 420 for controlling an operation of the UI 410 and operations of the applications corresponding to the first to third information indicators 511 to 513 registered within the UI 410 [FIG. 22 (b)]. In this instance, referring to FIG. 22 (b), the first operation control menu 420 may include a first menu 421 for ending activations of all applications, a second menu 422 for deleting all applications, a third menu 423 for saving the UI 410, a $4^{th}$ menu 424 for deleting the UI 410, and a $5^{th}$ menu 425 for changing a name of the UI 410.

Of course, the first operation control menu 420 of the present invention may be non-limited by the above configuration. For instance, the present invention may include all kinds of menus for controlling an operation of the UI 410 and operations of the applications corresponding to the information indicators 511 to 513 registered in the UI 410.

If the first menu 421 is selected, the controller 180 ends all the applications corresponding to the first to third information indicators 511 to 513 currently registered in the UI 410. If the second menu 422 is selected, the controller 180 may delete the first to third information indicators 511 to 513 currently registered in the UI 410 or may permanently delete the applications corresponding to the first to third information indicators 511 to 513 from the memory 160. If the third menu 423 is selected, the controller 180 may save the UI 410 including the first to third information indicators 511 to 513 in the memory 160. In doing so, if the applications corresponding to the first to third information indicators 511 to 513 are fully ended, the controller 180 stops displaying the UI 410. Thereafter, if the UI 410 saved in the memory 160 is selected, the controller 180 may simultaneously reactive the applications corresponding to the first to third information indicators 511 to 513 registered in the UI 410. If the $4^{th}$ menu 424 is selected, the controller 180 may delete the UI 410. If the $5^{th}$ menu 425 is selected, the controller 180 displays a name input window for giving a name to the UI 410 and then determines a name input via the name input window as a name of the UI 410.

Figure 23:
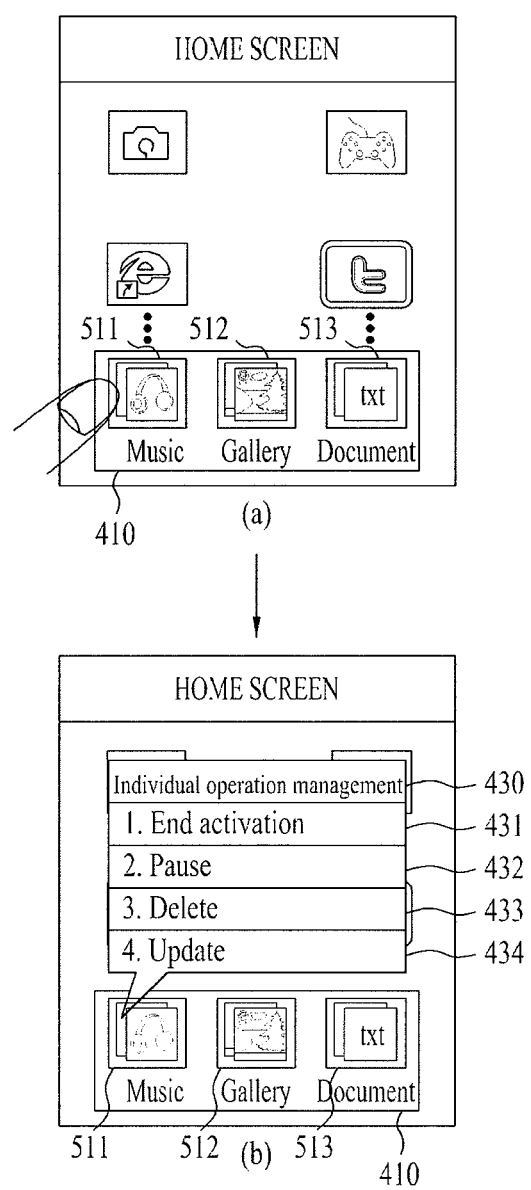

FIG. 23 shows a process for individually controlling a different operation of each of the applications corresponding to the first to third information indicators 511 to 513 registered in the UI 410. Referring to FIG. 23, if the first information indicator 511 is selected from the first to third information indicators 511 to 513 registered in the UI 410

[FIG. 23 (a)], the controller 180 displays a second operation control menu 430 for controlling an operation of the application corresponding to the selected first information indicator 511 [FIG. 23 (b)]. In this instance, referring to FIG. 23 (b), the second operation control menu 430 may include a first menu 431 for ending an activation of the application corresponding to the selected first information indicator 511, a second menu 432 for pausing the application corresponding to the selected first information indicator 511, a third menu 433 for deleting the application corresponding to the selected first information indicator 511, and a 4$^{th}$ menu 434 for updating the application corresponding to the selected first information indicator 511.

Of course, the second operation control menu 430 of the present invention may be non-limited by the above configuration. For instance, the present invention may include all kinds of menus for controlling an operation of the application corresponding to the selected first information indicator 511.

If the first menu 431 is selected, the controller 180 ends the activation of the application corresponding to the selected first information indicator 511. If the second menu 432 is selected, the controller 180 pauses the activation of the application corresponding to the selected first information indicator 511. If the third menu 433 is selected, the controller 180 deletes the application corresponding to the selected first information indicator 511 from the memory 160. If the 4$^{th}$ menu 434 is selected, the controller 180 accesses a provider website of the application corresponding to the selected first information indicator 511. If the application is updated on the provided website, the controller 180 controls the corresponding application to be updated via the provider website.

Figure 24:
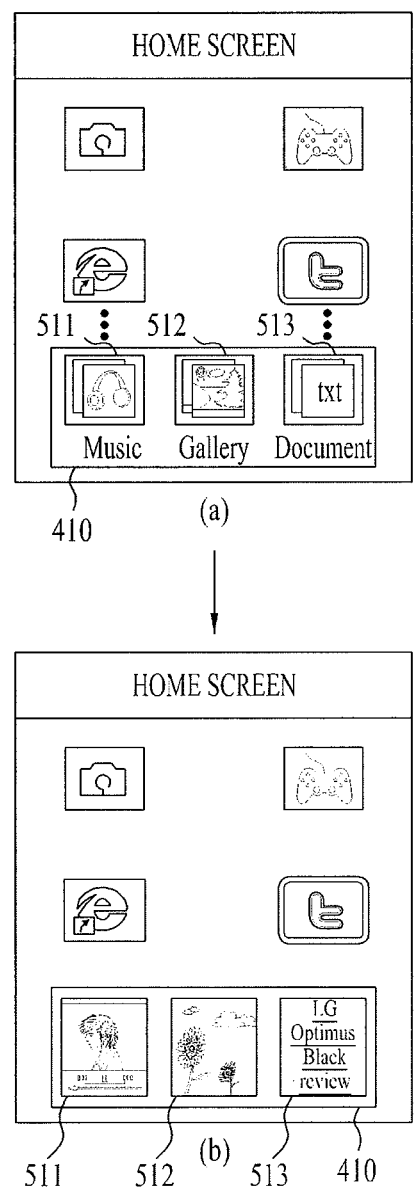

FIG. 24 shows a process for displaying active screens of the corresponding applications of the first to third information indicators 511 to 513 registered in the UI 410 as thumbnails, respectively. Referring to FIG. 24 (a), the first to third information indicators 511 to 513 are registered in the UI 410. In doing so, referring to FIG. 24 (b), the controller 180 may control the active screens of the applications, which correspond to the first to third information indicators 511 to 513 in the UI 410, to be displayed as preview time thumbnails, respectively. In particular, a user views the first to third information indicators 511 to 513 and can then check the current active screens of the applications corresponding to the first to third information indicators 511 to 513, respectively. For instance, referring to FIG. 24 (b), the active screen of the music application is displayed as a thumbnail in the first information indicator 511, the active screen of the gallery application is displayed as a thumbnail in the second information indicator 512, and the active screen of the document application is displayed as a thumbnail in the third information indicator.

Figure 25:
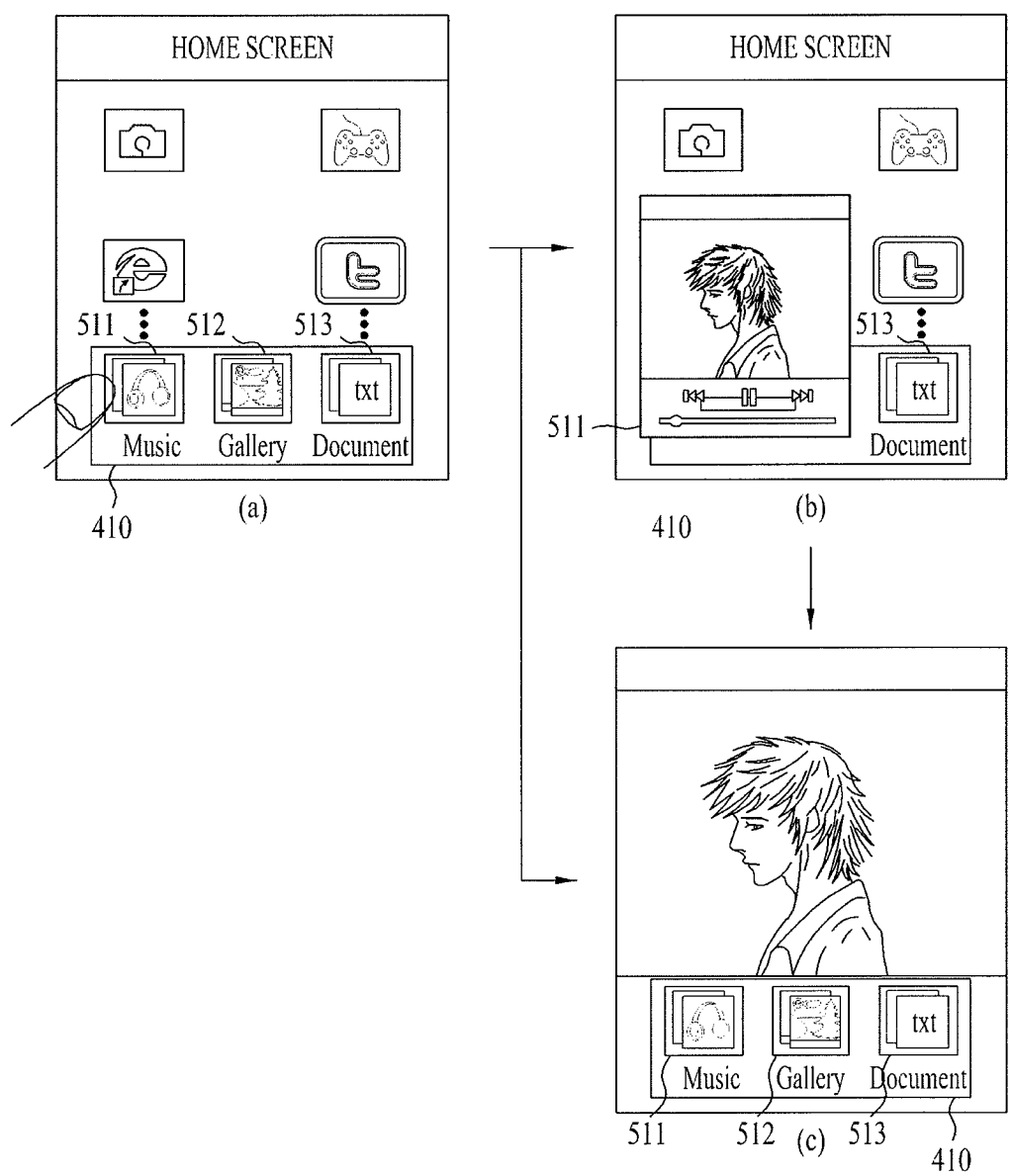

While the first to third information indicators 511 to 513 are registered in the UI 410, if a specific information indicator is selected, FIG. 25 shows a process for displaying an active screen of an application corresponding to the selected information indicator. Referring to FIG. 25 (a), the first to third information indicators 511 to 513 are registered in the UI 410. In doing so, if the first information indicator 511 is selected from the first to third information indicators 511 to 513 in the UI 410, referring to FIG. 25 (b) or FIG. 25 (c), the controller 180 may display an active screen of the music application corresponding to the selected first information indicator 511. In particular, referring to FIG. 25 (b), if the first information indicator 511 is selected from the first to third information indicators 511 to 513 in the UI 410, as mentioned in the foregoing description with reference to FIG. 24 (b), the controller 180 controls the active screen of the music application corresponding to the selected first information indicator 511 to be displayed as a thumbnail within the first information indicator 511 and also controls the first information indicator 511, which is displayed as the thumbnail, to be displayed by being enlarged. In doing so, if the enlarged first information indicator 511 is selected again, the controller 180 controls the enlarged first information indicator 511 to be displayed by being reconstructed into the original first information indicator 511 shown in FIG. 25 (a).

Moreover, referring to FIG. 25 (c), if the first information indicator 511 is selected from the first to third information indicators 511 to 513 in the UI 410, the controller 180 switches a current home screen to the active screen of the music application corresponding to the selected first information indicator 511 and then displays the corresponding active screen.

Figure 26:
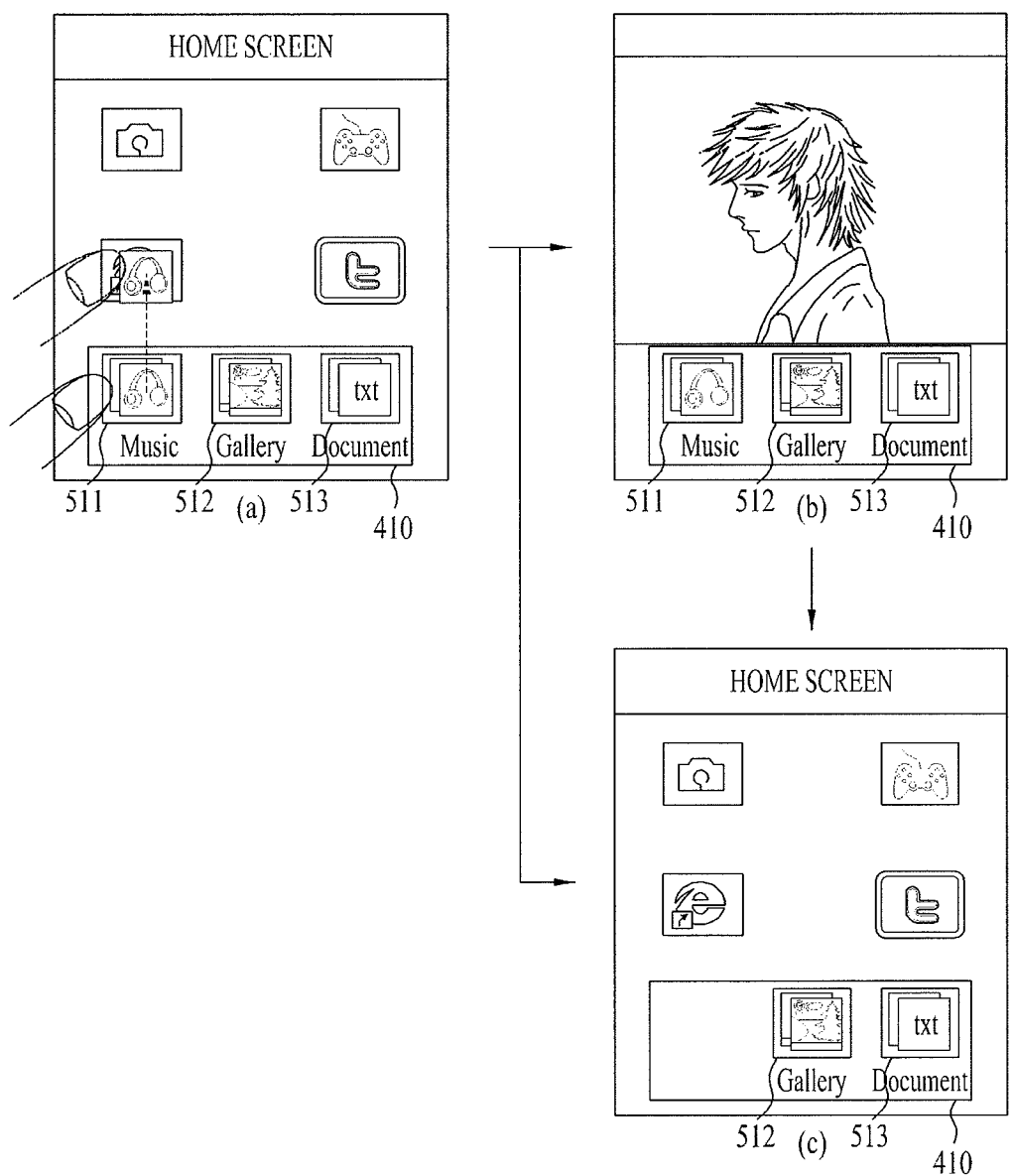

While the first information indicator 511 is selected from the first to third information indicators 511 to 513 in the UI 410, if a specific information indicator is shifted outside the UI 410, FIG. 26 shows a process' for controlling the shifted information indicator and an operation of an application corresponding to the shifted information indicator. Referring to FIG. 26 (a), the first to third information indicators 511 to 513 are registered in the UI 410. In doing so, if the first information indicator 511 among the first to third information indicators 511 to 513 in the UI 410 is dragged and dropped outside the UI 410, referring to FIG. 26 (b), the controller 180 can switch a current home screen to an active screen of the music application corresponding to the shifted first information indicator 511.

Moreover, if the first information indicator 511 among the first to third information indicators 511 to 513 in the UI 410 is dragged and dropped outside the UI 410, referring to FIG. 26 (c), the controller 180 can delete the shifted information indicator 511 from the UI 410.

If the first information indicator 511 among the first to third information indicators 511 to 513 in the UI 410 is dragged and dropped outside the UI 410, the controller 180 can delete the music function corresponding to the first information indicator 511 from the memory 160. If the first information indicator 511 among the first to third information indicators 511 to 513 in the UI 410 is dragged and dropped outside the UI 410, referring to FIG. 26 (b), the controller 180 can end or pause an activation of the music application corresponding to the shifted first information indicator 511.

Figure 27:
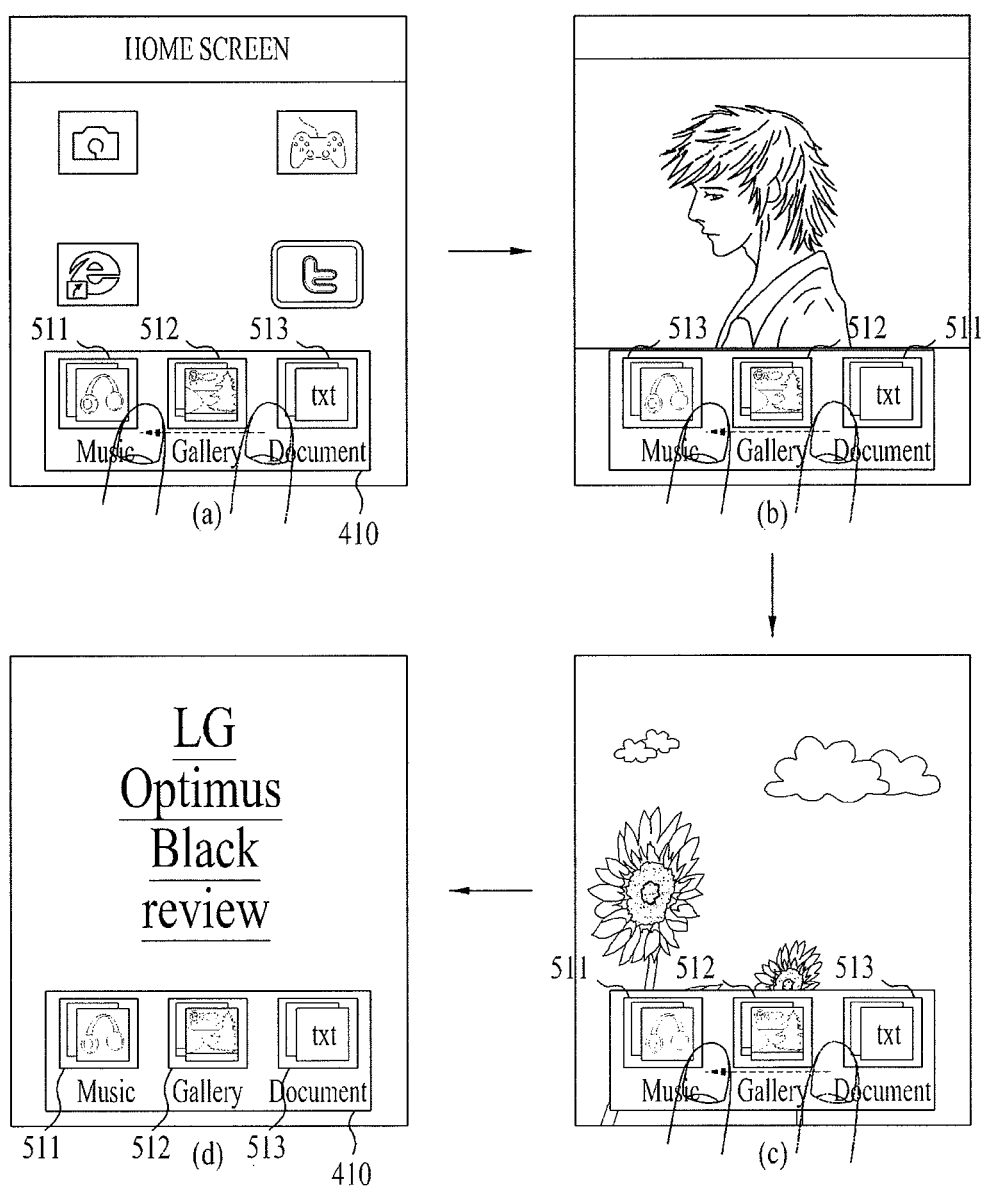

While the first to third information indicators 511 to 513 are registered in the UI 410, FIG. 27 shows a process for sequentially switching each of the active screens of the applications respectively corresponding to the first to third information indicators 511 to 513 registered in the UI in response to a touch gesture input to the UI 410. Referring to FIG. 27 (a), the first to third information indicators 511 to 513 are registered in the UI 410. Referring to FIG. 27 (b), if a flicking touch in a first direction is input to the UI 410, the controller switches a current home screen to the active screen of the music application corresponding to the first information indicator 511. In doing so, while the home screen is switched to the active screen of the music application, if a flicking touch in a second direction opposite to the first direction is input to the UT 410, the controller 180 may switch the active screen of the music application to the home screen again.

Moreover, referring to FIGS. 27 (b) to 27 (d), each time the flicking touch in the first direction is input to the UI 410, the controller 180 switches and displays the active screens of the corresponding applications in order of the active screen of the music application → the active screen of the gallery application → the active screen of the document application.

Figure 28:
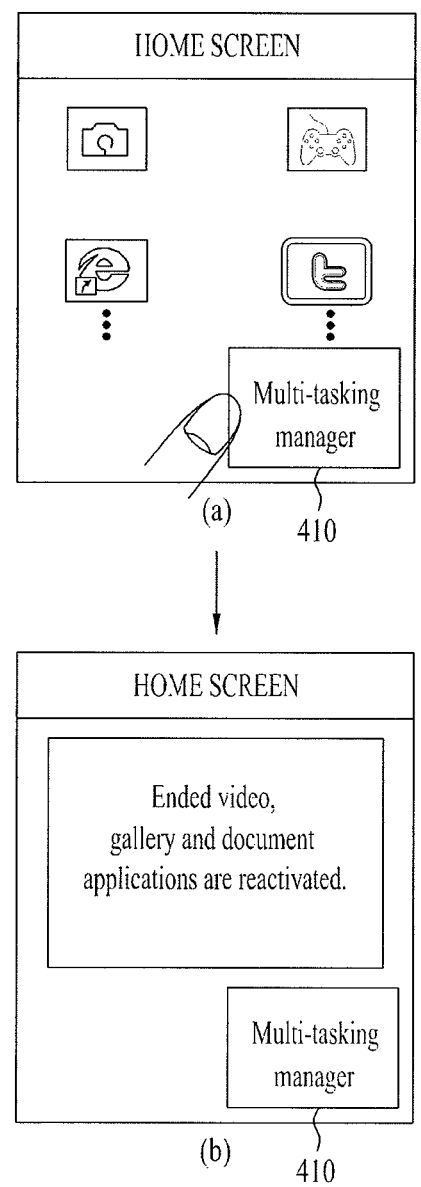

While all the applications corresponding to the first to third information indicators 511 to 513 registered in the UI 410 are ended, if the UI 410 is selected, FIG. 28 shows a process for simultaneously activating the applications again. Referring to FIG. 28 (a), while the first to third information indicators 511 to 513 are registered in the UI 410 by the former process shown in FIG. 3, all the applications corresponding to the first to third information indicators 511 to 513 are ended.

Referring to FIG. 28 (b), while all the applications are ended, if the UI 410 is selected, the controller 180 simultaneously activates the functions corresponding to the first to third information indicators 511 to 513 registered with the selected UI 410.

Figure 29:
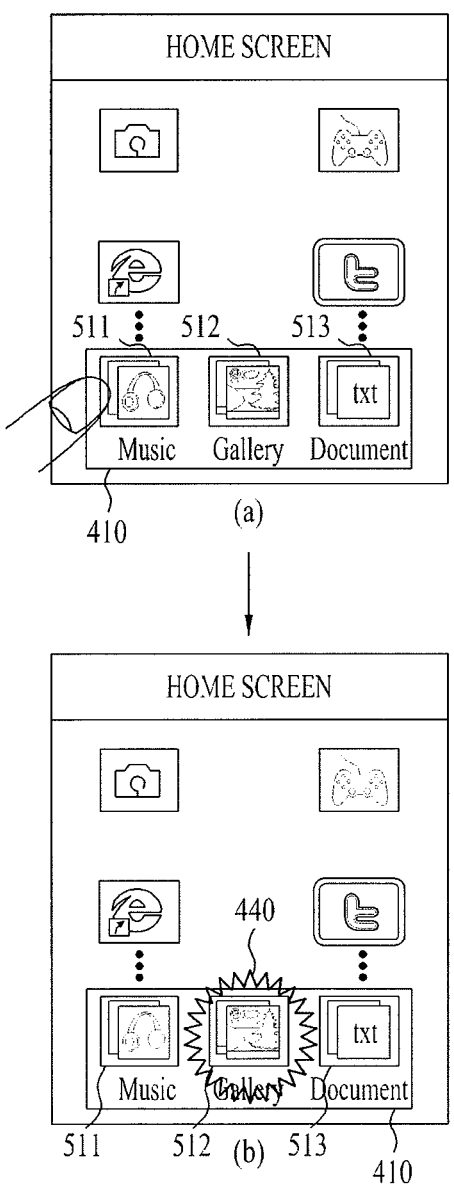

While the first to third information indicators 511 to 513 are registered in the UI 410, if a specific information indicator is selected, FIG. 29 shows a process for identifiably displaying an application, which is inter-workable with an application corresponding to the selected information indicator among the applications corresponding to the first to third information indicators 511 to 513. Referring to FIG. 29 (a), the first to third information indicators 511 to 513 are registered in the UI 410. In doing so, if the first information indicator 511 is selected from the first to third information indicators 511 to 513 registered in the UI 410, the controller 180 searches the applications corresponding to the second and third information indicators 512 and 513 for the application associated with the music application corresponding to the selected first information indicator 511.

Referring to FIG. 29 (b), the controller 180 may control the information indicator 512, which corresponds to the found application, to be identifiably displayed within the UI 410. In doing so, FIG. 29 shows that the information indicator 512 corresponding to the found application is identifiably displayed by a blinking 440, by which the present invention may be non-limited. In particular, the controller 180 may control the information indicator 512 corresponding to the found application to be identifiable displayed by differing from the rest of the information indicators 511 and 513 in color and size.

In FIG. 29, the application of the first information indicator 511 is the music application and the application of the second information indicator 512 is the gallery application, and the application of the third information indicator 513 is the document application. In this instance, because photos provided by the gallery application may be configured as an album image of a music currently played by the music application, the music application and the gallery application may be regarded as inter-workable.

Figure 30:
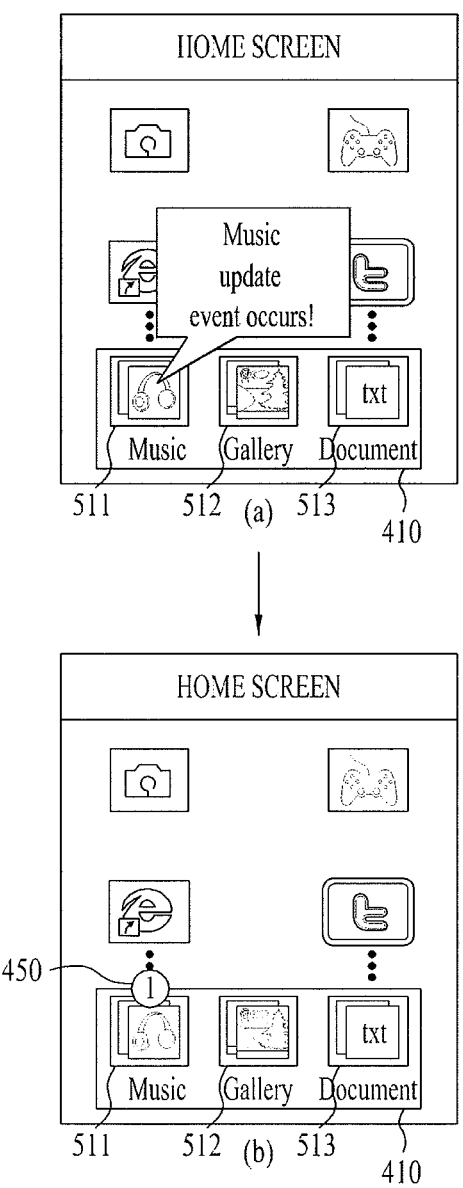

While the first to third information indicators 511 to 513 are registered in the UI 410, if an application, in which a specific event occurs currently, is found from the applications corresponding to the first to third information indicators 511 to 513 registered in the UI 410, FIG. 30 shows a process for displaying information, which indicates the occurrence of the event, within the information indicator corresponding to the found application. Referring to FIG. 30 (a), the first to third information indicators 511 to 513 are registered in the UI 410. In doing so, if an event 'update' occurs in the music application corresponding to the first information indicator 511 among the first to third information indicators 511 to 513 registered in the UI 410, referring to FIG. 30 (b), the controller 180 controls an event indication information 450, which indicates the occurrence of the event 'update', to be displayed within the first information indicator 511. In doing so, if the event indication information 450 is selected, the controller 180 may display detailed information of the occurring event or activate an operation corresponding to the occurring event directly. For instance, in FIG. 30, because the occurring event is the event 'update' of the music application, if the indication information 450 is selected, the controller 180 may directly update the music application via the wireless communication unit 110.

Accordingly, embodiments of the present invention provide various effects and/or features.

First of all, while a screen of a specific one of at least two currently active applications is being displayed, the present invention searches the applications for an application capable of interworking with a content included in the screen of the specific application and then informs a user of the found application, thereby directly activating the contented via the found application.

Secondly, the present invention provides a user interface capable of incorporatively managing operations of currently active applications on a current screen, thereby managing and controlling operations of applications currently active on an ongoing screen incorporatively.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other terminal;
a touchscreen configured to display an execution screen of a specific application selected by a user from one of a plurality of currently executed applications, said currently executed applications include different types of applications corresponding to respective different types of content, the displayed execution screen including selectable content, the selectable content is inter-workable with one or more of the different types of applications; and
a controller configured to:
control the touchscreen to display a plurality of indicators indicating each of the plurality of currently executed applications,
when at least one content is selected from the displayed execution screen of the specific application, recognize at least one application inter-workable with the selected content among the plurality of currently executed applications except the specific application, create at least one information indicator indicating the recognized at least one application capable of executing the selected content among the plurality of currently executed applications, control the touchscreen to display the at least one information indicator corresponding to the recognized at least one application more prominently than the rest of the plurality of indicators by blinking the at least one information indicator and displaying the at least one information indicator in 3D while displaying the rest of the plurality of indicators in 2D, when the displayed at least one information indicator is selected, execute the selected content via the recognized at least one application corresponding to the selected at least one information indicator, wherein the recognized at least one application includes a web application capable of searching for information associated with the selected content via a web, search for the information associated with the selected content via the web application, when a user's drag touch action having specific directionality is input to the displayed execution screen of the specific application, shift the displayed execution screen of the specific application in a direction corresponding to the user's drag touch action, and control the touchscreen to display the searched information within a display region between an initial position of the displayed execution screen of the specific application and a shifted position of the displayed execution screen of the specific application.

2. The mobile terminal of claim 1, wherein, when the selected content is shifted to a display position of the at least one information indicator by a user's drag touch action or the displayed at least one information indicator is shifted to a display position of the selected content by the user's drag touch action, the controller executes the selected content via the recognized at least one application corresponding to the selected information indicator.

3. The mobile terminal of claim 1, wherein the controller recognizes applications belonging to a group previously set by a user among the currently executed applications, and controls the touchscreen to display the at least one application capable of executing the selected content among the recognized applications.

4. The mobile terminal of claim 1, wherein the controller performs at least one of switching the execution screen of the specific application to an execution screen of the selected content, controls the touchscreen to display the execution screen of the selected content on the execution screen of the specific application, or controls the touchscreen to display the execution screen of the selected content as a thumbnail on a display position of the selected content within the execution screen of the specific application.

5. The mobile terminal of claim 1, wherein, before receiving a selection of the at least one content, the controller recognizes at least one content inter-workable with the currently executed applications exists among contents within the execution screen of the specific application and controls the touchscreen to display the recognized at least one content more prominently than the rest of contents.

6. The mobile terminal of claim 1, wherein the controller controls the touchscreen to display the selected content and the at least one information indicator in a same style to be identifiable within the execution screen of the specific application.

7. The mobile terminal of claim 1, wherein the controller controls the touchscreen to display guide information for guiding a user to select the information indicator indicating the application inter-workable with the selected content.

8. The mobile terminal of claim 1, wherein, before receiving a selection of the at least one content, the controller controls the touchscreen to display a user interface (UI), to which a function for managing operation of each of the plurality of currently executed applications is assigned, and to display the plurality of indicators indicating each of the currently executed applications on the execution screen of the specific application, and wherein, when at least two indicators corresponding to the plurality of currently executed applications having operations to be managed via the UI are registered among the plurality of indicators, the controller controls the registered indicators to be displayed on the UI and manages operations of the applications corresponding to the registered indicators via the UI.

9. The mobile terminal of claim 8, wherein, when the plurality of indicators to be registered is shifted into the UI, the controller recognizes the applications corresponding to the shifted indicators as the applications to be managed via the UI.

10. The mobile terminal of claim 8, wherein the UI executes the same operation control function for each of the applications corresponding to the registered indicators or executes a different operation control function for each of the applications corresponding to the registered indicators.

11. The mobile terminal of claim 10, wherein the UI provides at least one management function selected from ending the applications, pausing the applications, deleting the applications and updating the applications corresponding to the registered indicators.

12. The mobile terminal of claim 8, wherein, when a specific indicator is selected from the registered indicators, the controller switches the execution screen of the specific application to an execution screen of the application corresponding to the selected specific indicator.

13. The mobile terminal of claim 8, wherein, when a specific indicator is selected from the registered indicators, the controller enlarges and displays the selected specific indicator.

14. The mobile terminal of claim 8, wherein the controller controls the touchscreen to display the registered indicators as thumbnails on the UI, and wherein the thumbnails represents execution screens of the applications corresponding to the registered indicators.

15. The mobile terminal of claim 8, wherein, when the UI is selected after the applications corresponding to the registered indicators have been ended, the controller simultaneously restarts the ended applications.

16. The mobile terminal of claim 8, wherein, when a specific indicator is selected from the registered indicators, the controller searches the currently executed applications for at least one application inter-workable with the application corresponding to the selected specific indicator and then controls the touchscreen to display the found at least one application more prominently than the rest of the currently executed applications.

17. The mobile terminal of claim 8, wherein, when an application corresponding to one of the registered indicators has a specific event occur while the corresponding registered indicator is displayed, the controller controls the corresponding indicator to indicate an occurrence of the event.

18. The mobile terminal of claim 8, wherein even when the execution screen of the specific application is switched to an execution screen of another executed application, the controller continues displaying the UI.

19. A method of controlling a mobile terminal, the method comprising:
displaying, via a touchscreen, an execution screen of a specific application selected by a user from one of a plurality of currently executed applications, said currently executed applications include different types of applications corresponding to respective different types of content, the execution screen including selectable content, said selectable content is inter-workable with one or more of the different types of applications;
displaying, via the touchscreen, a plurality of indicators indicating each of the plurality of currently executed applications;
detecting, via a controller, when at least one selectable content is selected from the displayed execution screen of the specific application;
when at least one content is selected from the displayed execution screen of the specific application, recognizing, via the controller, at least one application inter-workable with the selected content among the plurality of currently executed applications except the specific application;
displaying, via the touchscreen, at least one indicator corresponding to the recognized at least one application more prominently than the rest of the plurality of indicators by blinking the at least one indicator and displaying the at least indicator in 3D while displaying the rest of the plurality of indicators in 2D;
when the displayed at least one indicator is selected, executing, via the controller, the selected content via the recognized at least one application corresponding to the selected at least one indicator,
wherein the recognized at least one application includes a web application capable of searching for information associated with the selected content via a web;
searching, via the controller, for the information associated with the selected content via the web application;
when a user's drag touch action having specific directionality is input to the displayed execution screen of the specific application, shifting, via the controller, the displayed execution screen of the specific application in a direction corresponding to the user's drag touch action; and
displaying, via the touchscreen, the searched information within a display region between an initial position of the displayed execution screen of the specific application and a shifted position of the displayed execution screen of the specific application.

20. The mobile terminal of claim 1, wherein a plurality of content of different types is included in the displayed execution screen, and
wherein, when the at least one content is selected, the controller recognizes at least one application inter-workable with the selected content, and when at least one other content is selected, the controller recognizes at least one other application inter-workable with the selected other content.

* * * * *